United States Patent [19]

Omae et al.

[11] Patent Number: 5,734,454
[45] Date of Patent: Mar. 31, 1998

[54] LIQUID CRYSTAL PANEL WITH REDUCING MEANS, MANUFACTURING METHOD THEREFOR AND PROJECTION DISPLAY APPARATUS USING THE SAME

[75] Inventors: Hideki Omae, Suita; Hiroshi Takahara; Shinya Sannohe, both of Neyagawa, all of Japan

[73] Assignee: Matsushita Electric Industrial Co., Ltd., Osaka, Japan

[21] Appl. No.: 350,631

[22] Filed: Dec. 7, 1994

[30] Foreign Application Priority Data

Dec. 8, 1993 [JP] Japan ..................... 5-307929
Dec. 24, 1993 [JP] Japan ..................... 5-329114

[51] Int. Cl.⁶ ............... G02F 1/1333; G02F 1/1335
[52] U.S. Cl. ............... 349/86; 349/92; 349/104; 349/158
[58] Field of Search ............... 359/51, 66, 52; 349/86, 92, 104, 158

[56] References Cited

U.S. PATENT DOCUMENTS

| | | | |
|---|---|---|---|
| 4,435,047 | 3/1984 | Fergason | 359/52 |
| 4,613,207 | 9/1986 | Fergason | 359/52 |
| 4,688,900 | 8/1987 | Doane et al. | 359/52 |
| 4,728,547 | 3/1988 | Vaz et al. | 359/51 |
| 4,822,144 | 4/1989 | Vriens et al. | 359/48 |
| 4,935,757 | 6/1990 | Hatano et al. | 349/110 |
| 4,938,568 | 7/1990 | Margerum et al. | 359/51 |
| 5,019,808 | 5/1991 | Prince et al. | 349/110 |
| 5,147,125 | 9/1992 | Austin | 359/359 |
| 5,150,232 | 9/1992 | Gunkima et al. | 359/51 |
| 5,216,531 | 6/1993 | Hirai et al. | 359/51 |
| 5,260,815 | 11/1993 | Takizawa | 359/51 |

FOREIGN PATENT DOCUMENTS

| | | | |
|---|---|---|---|
| 0568355 | 11/1993 | European Pat. Off. | |
| 4217416 A1 | 2/1994 | Germany | 359/51 |
| 0081624 | 5/1984 | Japan | 359/66 |
| 1-255832 | 10/1989 | Japan | |
| 2-96714 | 4/1990 | Japan | |
| 3-278024 | 12/1991 | Japan | |
| 5-203931 | 8/1993 | Japan | |

OTHER PUBLICATIONS

Fannin et al. Clinical Optics, 1987, p. 181, Figure 7-2.

*Primary Examiner*—William L. Sikes
*Assistant Examiner*—Toan Ton
*Attorney, Agent, or Firm*—Wenderoth, Lind & Ponack

[57] ABSTRACT

A liquid crystal panel includes a first substrate on which pixel electrodes are formed in a matrix pattern, a second substrate on which a counter electrode is formed, an ultraviolet reducing layer formed on one of the first and second substrates and corresponding to the matrix pattern of the pixel electrodes, and a polymer dispersion liquid crystal layer sandwiched between the first and second substrates. The polymer dispersion liquid crystal layer is cured by irradiating ultraviolet light from the side on which the ultraviolet reducing layer is formed such that the polymer dispersion liquid crystal layer arranged between the counter electrode and each pixel electrode has an average liquid crystal drop diameter which is larger than that arranged in other areas.

13 Claims, 16 Drawing Sheets

OFF STATE

ON STATE

LIQUID CRYSTAL PANEL WITH REDUCING MEANS, MANUFACTURING METHOD THEREFOR AND PROJECTION DISPLAY APPARATUS USING THE SAME

BACKGROUND OF THE INVENTION

The present invention relates to a polymer dispersion liquid crystal panel forming optical images as changes in the light scattering condition; to a manufacturing method for said liquid crystal panel; and to a projection display device for enlarging and projecting to a screen the images displayed on this liquid crystal panel.

Interest in large-screen display devices has grown significantly in recent years for applications such as home theater and business presentations. While many different types of projection devices using light valves have been proposed over the years, liquid crystal projection televisions whereby images displayed on a small liquid crystal panel are enlarged and projected using a projection lens and/or other optics to a large screen have more recently become available.

Images are displayed on liquid crystal panels primarily by electrically changing the optical characteristics of the liquid crystals. There are many different methods of accomplishing this based on a variety of operating principles. Twisted nematic (TN) liquid crystal panels used in currently available liquid crystal projection display devices use the changes in the optical rotatory power of the liquid crystals effected by varying the field strength. The drawback to this method is that TN liquid crystal panels require a polarizing plate on both the incidence and emission sides for light modulation, and these polarizing plates lower the efficiency of the device for light utilization.

Methods using the light scattering phenomenon of the liquid crystals can be used to control light without using polarizing plates. Examples of liquid crystal panels whereby optical images are formed by changing the light scattering state of the liquid crystals include phase change (PC), dynamic scattering (DSM), and polymer dispersion liquid crystals. Due to demand for improved image brightness, polymer dispersion liquid crystal panels such as described in U.S. Pat. No. 4,435,047 are being actively researched.

Polymer dispersion liquid crystals are described briefly below. Polymer dispersion liquid crystals can be divided into two major types according to the dispersion state of the liquid crystals and polymer. In one type, drop-shaped liquid crystals are dispersed in a polymer substance, and the liquid crystals are present in the polymer substance in a discontinuous state; this type of liquid crystal is referred to as a "PDLC" (polymer dispersion liquid crystal) below. In the other type, a network of polymer is laid through the liquid crystal layer, resulting in a structure similar to a sponge impregnated with liquid crystals. The liquid crystals in this structure are not drop-shaped, and are continuous throughout the structure; this type is referred to as a "PNLC" (polymer network liquid crystal) below. In both types of liquid crystal panels, images are displayed by controlling the light scattering and transmission states of the liquid crystals. Note that the present invention is described by way of example using primarily a PDLC. Provided that the term PDLC herein used is to be understood as including not only the polymer dispersion liquid crystal material but also the polymer network liquid crystal material as well.

Insofar as the resin is transparent, the polymer matrix in this type of polymer dispersion liquid crystal layer can basically be either a thermoplastic or thermosetting resin. Ultraviolet-setting resins are the simplest and offer good performance, and are therefore most commonly used. This is because the same manufacturing method used for TN liquid crystal panels can be applied without modification.

To manufacture conventional liquid crystal panels, the specified electrode pattern is first formed on the two top and bottom circuit boards, and these two circuit boards are laminated together with the corresponding electrodes in opposition. In the lamination process, a spacer having a uniform, predetermined grain size is sandwiched between the circuit boards, and the circuit boards are bonded with an epoxy resin sealant to hold a gap of a specified size between the circuit boards. The liquid crystal is then injected into this empty cell.

To manufacture polymer dispersion liquid crystal panels using this manufacturing method, it is sufficient to use a UV-setting resin, e.g., an acrylic resin, for the polymer matrix material. This is because the resin exists as a relatively low viscosity precursor of monomers and/or oligomers before injection, and the liquid crystal blend (the liquid crystal solution) has sufficient fluidity for injection at room temperature. As a result, the manufacturing method of a conventional liquid crystal panel can be used to produce the circuit board laminate to which the liquid crystal solution is then injected. After injection, the panel is exposed to light to advance the setting reaction forming the polymer dispersion liquid crystal layer.

By irradiating the panel with ultraviolet light after polymer injection, a polymerization reaction is effected only in the resin components to form the polymer, and the liquid crystal components are phase separated. When the liquid crystal content of the solution is less than the resin content, grain-shaped liquid crystal drops are separately formed; when the liquid crystal content is greater, the polymer matrix exists in a granular or networked state in the liquid crystal material, and the liquid crystal is formed in a continuous layer. The size of the liquid crystal drops or the hole size in the polymer network at this time must be fairly uniform and within the range of approximately 0.1 µm to several µm, otherwise light scattering performance will be poor and contrast low. As a result, the material must be completely curable in a relatively short period of time. UV-setting resins satisfy these requirements and are therefore preferable.

The operation of a polymer dispersion liquid crystal is described briefly below with reference to FIGS. 27 and 28. Shown in FIGS. 27 and 28 are the array substrate 231, pixel electrode 232, counter electrode 233, drop-shaped liquid crystals 234, polymer 235, and counter electrode substrate 236. Note that thin-film transistors (TFT) and other components not shown in the figures are connected to the pixel electrode 232, and light is modulated by changing the direction of liquid crystal orientation on the pixel electrode by turning the TFT on/off to apply a voltage to the pixel electrode.

When a voltage is not applied as shown in FIG. 27, the drop-shaped liquid crystals 234 are oriented in irregular directions, causing a difference in the refractive indices of the polymer 235 and the drop-shaped liquid crystals 234, and scattering the incident light.

When a voltage is applied to the pixel electrode 232 as shown in FIG. 28, the liquid crystals become oriented in the same direction. If the refractive index of the liquid crystals when oriented in a specific direction is adjusted to match the refractive index of the polymer, the incident light will not be scattered and will be emitted from the array substrate 231. Note that when the liquid crystals have a drop-like shape similar to a PDLC, the average diameter of the drop-shaped liquid crystal is called the average particle diameter. In a PNLC the hole diameter is normally expressed, but this is also referred to as the average particle diameter in this specification.

An example of a projection display device using this type of polymer dispersion liquid crystal panel is described in U.S. Pat. No. 5,150,232. In the device described in this patent, the light from a single light source is split into the wavelength groups of the three primary colors (red (R), green (G), and blue (B)) conducted to different optical paths using a dichroic prism; a polymer dispersion liquid crystal panel is placed in each optical path as a light valve; the light modulated by these polymer dispersion liquid crystal panels is then merged again using a dichroic prism; and the image is enlarged and projected to the screen using a projection lens.

In a conventional TN liquid crystal panel, a shading layer called a black matrix is formed in the non-display area between pixels. More specifically, in an active matrix liquid crystal panel comprising switching elements, this black matrix is formed on a substrate opposite the switching elements and signal electrodes. This is to improve contrast, to prevent photoconductivity in the TFT, and to block light leakage caused by reverse tilting of the liquid crystals resulting from horizontal fields applied between the signal lines and the electrodes in an active matrix liquid crystal panel.

However, this black matrix cannot be formed when a UV-setting resin is used for the polymer matrix in a polymer dispersion liquid crystal. This is because if the polymer dispersion liquid crystal panel is formed by the method described above in the empty cell in which the black matrix is formed, the UV light used for UV-setting of the resin will be blocked by the black matrix, and the resin in the shaded area will remain uncured.

In a polymer dispersion liquid crystal panel in which a black matrix is not formed, the field applied between the signal lines and the electrodes causes the liquid crystal molecules to stand up, the scattering power to weaken, and light leakage to occur. The light leaking from between the pixels thus blurs the image, and results in an image lacking in sharp definition. When a TFT is used for the switching elements, this leaked light penetrates to the semiconductor layer of the TFT, a leakage current caused by photoconductivity develops, and crosstalk and other display problems occur.

In a projection display device using a reflective liquid crystal panel, if the black matrix is formed using a metallic thin film of chrome or another metal in the liquid crystal panel, the light incident to the liquid crystal panel and reflected by the black matrix is emitted without being modulated in any way, resulting in extraneous reflected light that lowers contrast.

In addition, scattered light with a large emission angle is completely reflected to the liquid crystal layer by the substrate-air interface. Beams returning to the non-display areas between pixels, in particular, induce photoconductivity in the TFT, producing scattering in this area again, after which the scattered light returns to the emission side. The result is reduced display contrast and display quality.

Moreover, the wavelength dependency of the scattering characteristics of the polymer dispersion liquid crystal panel is high. In particular, the scattering characteristics of red light, which has a long wavelength, are inferior to the characteristics of green and blue light. As a result, liquid crystal panels that modulate red, green, and blue light for each pixel by means of color filters suffer from poor contrast in the red spectrum only.

SUMMARY OF THE INVENTION

Therefore, an object of the present invention is to improve the display quality of a polymer dispersion liquid crystal panel without forming a black matrix, and to improve contrast in a liquid crystal projection display device using this polymer dispersion liquid crystal panel.

To achieve this object, a liquid crystal panel according to the present invention comprises first and second opposing substrates of which at least one is a light transmitting material; an electrode layer formed on the opposing surfaces of the first and second substrates; a polymer dispersion liquid crystal layer sandwiched between the first and second substrates; and an ultraviolet reflecting layer in part of the pixel display area of at least one of the first and second electrode substrates.

Another aspect of a liquid crystal panel according to the invention comprises first and second opposing substrates of which at least one is a light transmitting material; an electrode layer formed on the opposing surfaces of the first and second substrates; a polymer dispersion liquid crystal layer sandwiched between the first and second substrates; and an ultraviolet absorbing layer in part of the pixel display area of at least one of the first and second electrode substrates.

Another embodiment of a liquid crystal panel according to the invention comprises first and second opposing substrates of which at least one is a light transmitting material; an electrode layer formed on the opposing surfaces of the first and second substrates; and a polymer dispersion liquid crystal layer sandwiched between the first and second substrates; and is characterized by the first substrate comprising switching elements controlling the pixel electrodes and the signal applied to the pixel electrodes, and the signal line applying signals to said switching elements; and the second substrate comprising opposing electrodes patterned to the display area and the non-display area.

A manufacturing method for a liquid crystal panel according to the present invention sandwiches a liquid crystal resin mixture between the two substrates described above; and irradiates ultraviolet light from the substrate on which the ultraviolet reflecting layer is formed, the substrate on which the ultraviolet absorbing layer is formed, or the opposing patterned substrate to form the polymer dispersion liquid crystal layer.

By means of this configuration, the ultraviolet irradiation level differs according to the display area of the panel. There are thus areas of high and low ultraviolet irradiation in the liquid crystal layer, and the liquid crystal layer is formed with the particle diameter of the liquid crystals differing according to areas on the substrate.

At least one of the two substrates between which the liquid crystal layer is sandwiched in a polymer dispersion liquid crystal panel according to the present invention satisfies the following equation 1;

$$t \geq (d/4)\sqrt{n^2 - 1} \qquad [1]$$

where t is the center thickness of the substrate, n is the refractive index, and d is the maximum diameter of the effective display area of the liquid crystal panel.

In a liquid crystal panel according to another embodiment of the invention, a transparent panel is provided on the light incidence and/or emission side of the liquid crystal panel, and said transparent panel is optically bonded to said liquid crystal panel by means of a transparent bonding agent.

In a liquid crystal panel modulating red, green, and blue light for each pixel by means of color filters, a layer reflecting or absorbing ultraviolet light is formed over the pixels modulating green and blue light, or this layer is formed over every pixel with the ultraviolet reflectivity or absorption of the layer formed over the pixels differing according to the modulated optical wavelength of each pixel. The ultraviolet reflectivity or absorption factor of the layer formed over the pixels modulating red in particular is lower than that of the layers formed for the other pixels.

A projection display device according to the present invention comprises a light generating means; a liquid crystal panel forming optical images as changes in the light scattering state; and a projection means for projecting light modulated by the liquid crystal panel; and is characterized by the liquid crystal panel of the projection display device being a liquid crystal panel according to the invention.

The present invention is further characterized by the quantity of ultraviolet light irradiated to the polymer dispersion liquid crystal layer differing according to the area in the panel during phase separation by ultraviolet irradiation of the liquid crystals in the polymer dispersion liquid crystal layer; a photo-setting resin is used as the polymer matrix. Particularly in an active matrix liquid crystal panel, if the ultraviolet transmittance of the non-display area of the signal line and TFT substrates is higher than that of the display area of the pixel electrode, the polymerization rate of the polymer matrix in the non-display area will be fast and phase separation from the liquid crystals will be fast. As a result, the structure of the polymer dispersion liquid crystal layer will vary, the liquid crystal particle diameter of the polymer dispersion liquid crystal layer in the non-display area will be extremely small, scattering performance will be extremely high, and the drive voltage will also be high. Therefore, if a layer reflecting or absorbing ultraviolet light is formed only in the pixel area of the liquid crystal panel, and the panel is irradiated from the side of the substrate on which this layer is formed, the scattering performance and drive voltage of the liquid crystal layer in the non-display area will be greater than in the display area of the liquid crystal layer. As a result, a high quality black display will always be obtained in this area even without a black matrix in the non-display area. The panel also exhibits good resistance to driving by horizontal fields applied between the signal lines and electrodes.

Light scattered by the polymer dispersion liquid crystals and emitted is partially reflected by the substrate-air layer interface, and is again scattered by the polymer dispersion liquid crystal layer. This so-called secondary light source caused by diffuse reflection increases the luminance of the liquid crystal layer normally displaying black. It is particularly necessary to prevent reflected light incident to the polymer dispersion liquid crystal layer of the non-display area between pixels. This is to minimize the luminance of the liquid crystal layer in this layer because there is no black matrix between pixels, and to prevent TFT photoconductivity caused by reflected light.

The critical angle of total reflection resulting from the refractive index of the substrate and air is defined by equation [2] below where 'n' is the refractive index of the substrate.

$$\theta = \sin^{-1}(1/n) \quad [2]$$

All scattered light emitted at an angle greater than this angle is reflected to the polymer dispersion liquid crystal layer and again scattered. To prevent this, it is sufficient to adjust the substrate thickness so that the light that is totally reflected at the critical angle does not reach the liquid crystal layer again. This thickness is provided by equation [3] below where t is the substrate thickness, and d is the maximum diameter of the effective display area.

$$t \geq (d/4)\sqrt{n^2 - 1} \quad [3]$$

Next, if light is reflected by a ineffective surface, the light returns to the liquid crystal layer, inviting increased luminance in the non-display area between pixels. This problem can be resolved by providing a light absorbing means on the ineffective surface of the transparent substrate on the emission side to absorb extraneous light. In addition, if an anti-reflection coating is provided in the effective area of the emission surface of the emission-side transparent substrate, the reflectivity of the emission surface of light emitted from the liquid crystal layer at a small angle will decrease, and the increase in luminance in the black display area and the non-display area between the pixels can be reduced.

If the light modulated by the liquid crystal panel is long wavelength light (e.g., red light), liquid crystal drops with a large average particle diameter are better for obtaining good contrast. When the wavelength is short (e.g., blue light), a small average particle diameter is conversely better for obtaining good contrast. The reflectivity or absorption factor of the conductive thin film reflecting or absorbing ultraviolet light can be varied by controlling the film thickness. As a result, by using substrates on which are formed conductive thin films of differing film thicknesses according to the wavelength of light to be modulated by the liquid crystal panel, and irradiating the substrates with ultraviolet light of a constant strength, polymer dispersion liquid crystal panels of the desired characteristics can be obtained.

By the means described above, it is possible to provide a liquid crystal panel for displaying sharp, bright, high contrast images without using a black matrix because the brightness of non-display areas between the pixels can be reduced and a high quality black display can be maintained. Furthermore, by using this liquid crystal panel in a projection television or other projection display device, bright images with good contrast can be obtained.

If the same action is used in a liquid crystal panel comprising color filters and modulating red, green, and blue light every pixel, a layer reflecting or absorbing ultraviolet light is formed over the pixels modulating green and blue light, and the layer is simultaneously irradiated with light to form the polymer dispersion liquid crystal layer, the polymer dispersion liquid crystal layer of pixels modulating red light will have a smaller liquid crystal particle diameter than that of the polymer dispersion liquid crystal layer of pixels modulating green light, and scattering performance will be high. It is therefore possible to obtain consistent contrast by equalizing the scattering characteristics of the liquid crystal layers for each wavelength of light controlled by each pixel. Note that the same effect can be obtained even if this layer is formed over each pixel, and the ultraviolet reflectivity or absorption factor of the layer formed over at least the pixels modulating red is low.

By means of the invention thus described, unpolymerized resin is no longer left in the liquid crystal layer and reliability is improved because a black matrix is not formed in the polymer dispersion liquid crystal panel.

The liquid crystal layer in the non-display area between pixels does not become transparent at the normal drive voltage, is therefore unaffected by horizontal fields, and can thus prevent light leaks around the pixels. In addition, a high quality black display is normally possible even though there is no black matrix, and a liquid crystal panel with high display contrast can be provided.

It is also possible to provide a liquid crystal panel with good contrast and brightness in all red, green, and blue pixels by means of a single, color-capable liquid crystal panel using color filters.

Furthermore, by making the transparent substrate thick, or by combining a transparent panel with a transparent substrate, a liquid crystal panel displaying high quality images that are bright, in good contrast, and free of crosstalk caused by photoconductivity can be provided.

A projection display device capable of displaying bright, high contrast images can also be provided by using the liquid crystal panel of the invention for even greater effectiveness.

BRIEF DESCRIPTION OF THE DRAWINGS

The present invention will become more fully understood from the detailed description given below and the accompanying drawings wherein:

FIG. 27 shows an off state and FIG. 28 shows an on state, respectively.

DESCRIPTION OF PREFERRED EMBODIMENTS

Figure 1:
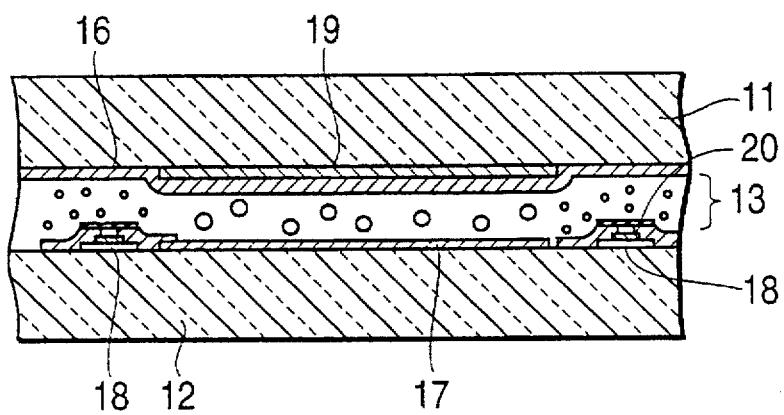
FIG. 1 is a cross section of a liquid crystal panel according to a first embodiment of the present invention.
Figure 2:
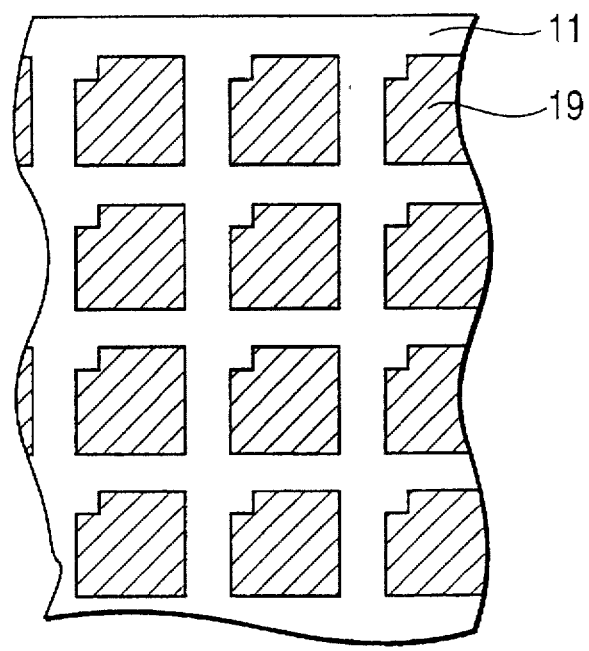
FIG. 2 is a plan view of a glass substrate for showing ultraviolet reflecting layer portions according to the first embodiment of the present invention.

The preferred embodiments of the invention are described hereinbelow with reference to the accompanying figures, of which FIGS. 1 and 2 show a liquid crystal panel according to the first embodiment. FIG. 1 is a cross section of the liquid crystal panel, and FIG. 2 is a plan view of a counter substrate of this liquid crystal panel.

As shown in FIG. 1, a liquid crystal panel according to the present invention comprises a polymer dispersion liquid crystal layer 13 sandwiched between two transparent substrates 11 and 12. Transparent electrodes forming counter electrode 16 and pixel electrodes 17 are formed on the liquid crystal layer side of the substrates 11 and 12, respectively. An ITO film, which is an alloy of indium oxide and tin oxide, is used for the counter electrode 16 and the pixel electrodes 17; the counter electrode 16 is formed by coating an ITO film over the entire substrate surface, and the pixel electrodes 17 are formed by applying a film in a matrix pattern. Thin-film transistors 18 are provided as switching elements near each of the pixel electrodes 17. Each TFT 18 is connected to a source signal line (not shown in the figures) and to a gate signal line (not shown in the figures); the TFTs are connected to the corresponding signal supply circuit and scanning circuit to supply the appropriate signal voltage to each pixel.

Light incident on the liquid crystal layer transmits the layer when an electric field of sufficient strength is applied to the polymer dispersion liquid crystal layer 13, but is scattered when no electric field is applied. As a result, it is possible to control the light scattering state of the liquid crystal layer for each pixel by controlling the applied voltage.

Note that a black matrix or similar light shielding layer is not formed on the counter electrode 16. Photoconductivity of the TFT is prevented in this embodiment by providing a direct shield layer 20 only over the TFT 18. While the shield layer 20 used in this embodiment is an acrylic resin with a carbon filler, it is also possible to use a chrome or other metallic material separated from the electrodes by an insulating layer (not shown). This is, however, provided to prevent TFT photoconductivity when there is strong incident light, such as when used as a light valve for a projection television, and is not necessary for other applications.

An ultraviolet reflecting layer 19 is patterned to form an ultraviolet reflecting means only in the areas corresponding to the pixel electrodes 17 on the surface of the liquid crystal layer side of the counter substrate 11. The counter electrode 16 is formed over the ultraviolet reflecting layer 19. For further simplification, a plan view of the opposing substrate 11 is shown in FIG. 2. The shape of the ultraviolet reflecting layer 19, as indicated by hatched areas in FIG. 2, essentially matches each pixel electrode 17.

The ultraviolet reflecting layer 19 in this embodiment is a multiple layer film of alternating $SiO_2$ and $HfO_2$ conductive thin films, but may alternatively be a multiple layer film of a conductive thin film with a low refractive index (such as $Al_2O_3$, $CeF_3$, $WO_3$, $LaF_3$, or $NdF_3$) alternating with a conductive thin film with a high refractive index (such as $CeO_2$, $TiO_2$, or $Nd_2O_5$).

Table 1 shows an example of the ultraviolet reflecting layer 19 formed by depositing $SiO_2$ and $HfO_2$ alternatively.

TABLE 1

| material | reflective index | thickness nd (nm) |
| --- | --- | --- |
| glass sub. | 1.52 | — |
| $SiO_2$ | 1.46 | 164.7 |
| $HfO_2$ | 2.00 | 106.6 |
| $SiO_2$ | 1.46 | 64.0 |
| $HfO_2$ | 2.00 | 80.7 |
| $SiO_2$ | 1.46 | 98.1 |
| $HfO_2$ | 2.00 | 98.1 |
| $SiO_2$ | 1.46 | 74.0 |
| $HfO_2$ | 2.00 | 89.9 |
| $SiO_2$ | 1.46 | 84.4 |
| $HfO_2$ | 2.00 | 112.1 |
| $SiO_2$ | 1.46 | 62.9 |
| $HfO_2$ | 2.00 | 103.6 |
| $SiO_2$ | 1.46 | 74.0 |
| $HfO_2$ | 2.00 | 99.9 |
| $SiO_2$ | 1.46 | 87.0 |
| ITO | 2.00 | 56.6 |
| LC | 1.50 | — |

The liquid crystal material used in the liquid crystal panel of the invention is preferably a nematic liquid crystal, smectic liquid crystal, or cholesteric liquid crystal material, but may be a solution of a single or a mixture containing two or more types of liquid crystal compounds or a liquid crystal compound with a material other than a liquid crystal compound. It is to be noted that of the liquid crystal materials listed above, cyanobiphenyl nematic liquid crystals or chloric nematic liquid crystals are preferable because they have a relative large difference between the extraordinary ray refractive index $n_e$ and ordinary ray refractive index $n_o$. A transparent polymer is preferable as the polymer matrix material, and while the polymer may be a thermoplastic, thermosetting, or photosetting resin, a UV-setting type resin is preferable because of the simplicity of the manufacturing process and separation of the liquid crystal phase. A UV-setting acrylic resin containing acrylic monomers and/or acrylic oligomers polymerized by exposure to ultraviolet light is used by way of example herein.

Monomers for forming polymer of this type include: 2-ethylhexyl acrylate; 2-hydroxyethyl acrylate; neopentyl glycol acrylate; hexanediol diacrylate; diethylene glycol diacrylate; tripropylene glycol diacrylate; polyethylene glycol diacrylate; trimethylol propane triacrylate; and pentaerythritol acrylate.

Oligomers and prepolymers include: polyester acrylate; epoxy acrylate; and polyurethane acrylate.

A polymerization initiator may be used to quickly induce polymerization, and such initiators include: 2-hydroxy-2-methyl-1-phenylpropane-1-one (mfg. by Merck, "Darocure 1173"); 1-(4-isopropylphenyl)-2-hydroxy-2-methylpropane-1-one (mfg. by Merck, "Darocure 1116"); 1-hidroxycyclohexyl phenyl ketone (mfg. by Ciba-Geigy, "Irgacure 184"); and benzyl methyl ketal (mfg. by Ciba-Geigy, "Irgacure 651"). Note, also, that other components may include chain transfer agents, photosensitizers; dyes; dichroic pigments; and crosslinking agents.

While the amount of liquid crystal material in the polymer dispersion liquid crystal layer is not specified herein, it is normally in the range of approximately 20%–90%, and is preferably in the range 50%–85%. If the liquid crystal material content is less than 20%, there will be a relatively small number of liquid crystal drops and the scattering effect will be deficient; if greater than 90%, there is a strong tendency toward phase separation of the polymer and liquid crystals into two vertical layers, the interfacial area is small, and the scattering characteristics deteriorate. The structure of the polymer dispersion liquid crystal layer varies according to the liquid crystal content: the liquid crystal drops exist as independent droplets at a liquid crystal content of less than approximately 60%, and a continuous layer of intermingled polymer and liquid crystals is formed at greater than approximately 60%. The thickness of the polymer dispersion liquid crystal layer 13 is preferably from 5 to 25 mm. If the film thickness is too thin, scattering characteristics deteriorate and contrast is poor; if too thick, high voltage drive is required and design of the drive IC becomes more complicated.

Figure 3:
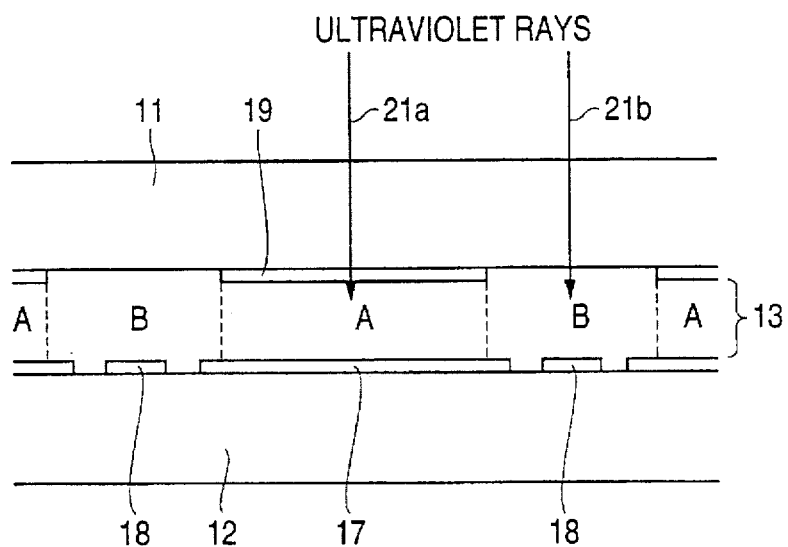
FIG. 3 is an explanatory view for showing the principle of manufacturing the liquid crystal panel according to the present invention.

The method of manufacturing a liquid crystal panel according to the present invention is described next with reference to primarily FIG. 3. It should be first noted that various known manufacturing methods may be used to manufacture the pixel electrode 17 and other components on the array substrate 12. Thin films of $SiO_2$ are then formed alternately with thin films of $HfO_2$ to laminate a dielectric thin film 19 as the ultraviolet reflecting layer on the counter substrate 11. The film thickness of the conductive thin film 19 must be experimentally determined based on the wavelength and spectral distribution of the ultraviolet light emitted from the high pressure mercury lamp or other ultraviolet light emission apparatus used to form the polymer dispersion liquid crystal layer. What is important is that the conductive thin film 19 be formed only in the areas corresponding to the pixel electrodes on the array substrate 12, and that the ultraviolet transmittance of this area be less than the transmittance of the areas in which the conductive thin film 19 is not formed, preferably in the range of 30%–70%.

A method of selective film formation is described below. After first forming a film over the complete surface by vapor deposition, the conductive thin film 19 of the area corresponding to the non-pixel electrode area is patterned by etching the $HfO_2$ film with sulfuric acid and the $SiO_2$ film with hydrofluoric acid. The conductive thin film 19 may be alternatively formed using other materials, including $Al_2O_3$, $CeF_3$, $WO_3$, $LaF_3$, $NdF_3$, or other low refractive index conductive thin film, and $CeO_2$, $HfO_2$, $Nd_2O_5$ or other high refractive index conductive thin film. Because there is virtually no absorption of the visible light spectrum, there will no effect on the transmission of visible light even if the conductive thin film is left on the substrate after forming the polymer dispersion liquid crystal layer 13. Reliability is thus improved because ultraviolet light incident into the liquid crystal layer corresponding to the pixel electrodes is blocked.

The two substrates 11 and 12 are then placed together and positioned with the electrode faces in opposition and a specified gap therebetween, and the circumference is sealed, leaving an injection port through which the uncured photosetting resin and liquid crystal mixture solution is injected. It is also possible to drip the mixture solution when the two substrates are placed together, and then seal the circumference while holding the specified gap between the substrates.

Mixed solutions of the materials and specific gravities shown in Table 2 were prepared as the polymer dispersion liquid crystal material.

TABLE 2

| Composition | Weight (g) |
| --- | --- |
| liquid crystal: BL002 (mfg. by Merk Japan Ltd.) | 8.200 |

TABLE 2-continued

| Composition | Weight (g) |
|---|---|
| monomers: | |
| 2-ethylhexyl acrylate | 0.600 |
| 2-hydroxyethyl acrylate | 0.600 |
| (both mfg. by Nacalai Tesque, Inc.) | |
| oligomer: Biscoat 823 | 0.600 |
| (mfg. by Osaka Yuki Kagaku Kogyo Co., Ltd. | |
| polymerization initiator: | 0.600 |
| benzyl dimethyl ketal | |
| (mfg. by Nippon Kayaku Co., Ltd.) | |

After thus preparing liquid crystal panels comprising an uncured photosetting resin and a mixed liquid crystal solution filled between two substrates, the panel is exposed for 150 seconds from the side of the counter substrate 11 with ultraviolet light at an irradiation strength of 30 mW/cm$^2$. This ultraviolet exposure cures the mixed solution, forms the polymer matrix and phase separates the liquid crystals, and thus forms the polymer dispersion liquid crystal layer 13. The amount of ultraviolet light irradiated to the liquid crystal layer is different in areas A where the ultraviolet reflecting layer 19 is formed and areas B where the ultraviolet reflecting layer 19 is not formed. As a result, the average particle diameter of the liquid crystal drops in areas A where the ultraviolet reflecting layer 19 is formed and ranges 1.0–2.0 µm, and is less than 1.0 µm in areas B where the ultraviolet reflecting layer 19 is not formed.

Figure 4:
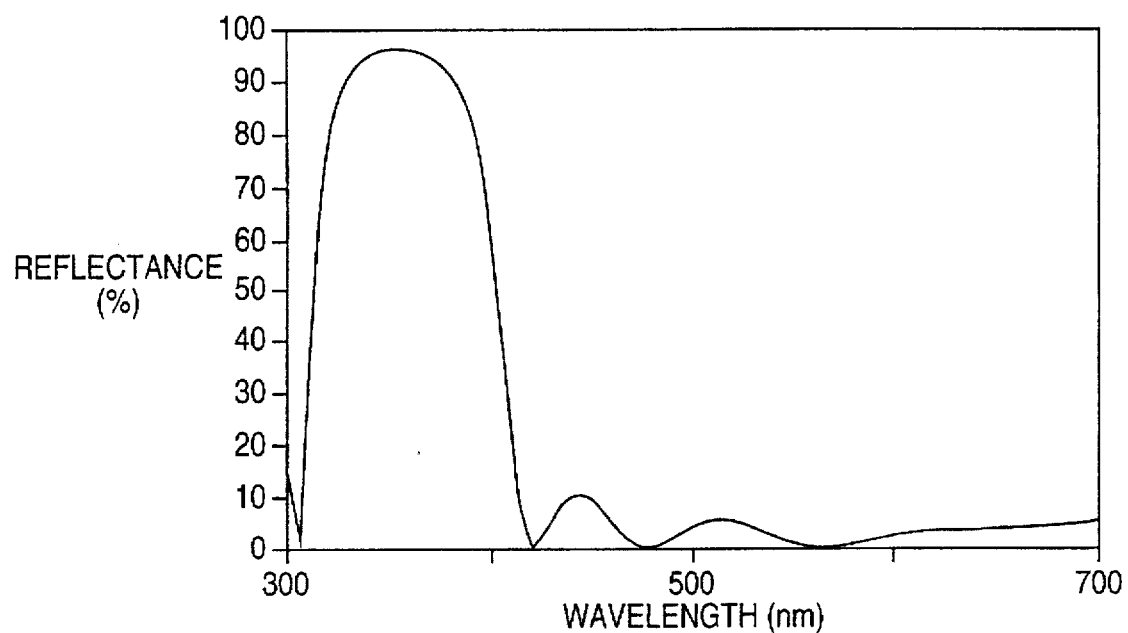
FIG. 4 is a graph showing a light reflecting characteristic of the ultraviolet reflecting layer according to the first embodiment of the present invention.

FIG. 4 is a graph of the light reflectance at various wavelengths of the ultraviolet reflecting film 19 used in this embodiment. As will be known from this graph, the reflectance of light with a wavelength with a range 300 to 400 nm is extremely high. Ultraviolet irradiation is extremely high in those areas where the ultraviolet reflecting layer 19 is not formed relative to those areas where it is formed. Therefore, phase separation of the liquid crystals and polymer proceeds quite quickly in those areas where the ultraviolet reflecting layer 19 is not formed, and the diameter of the formed liquid crystal particles becomes extremely small.

By thus manufacturing the liquid crystal panels as described above, the liquid crystal particle diameter of the polymer dispersion liquid crystal layer 13 in the non-display area between the pixels (as shown in FIG. 1) can be made extremely small relative to the liquid crystal particle diameter of the polymer dispersion liquid crystal layer 13 in the display area. The drive voltage of the liquid crystal layer must be 5–6V for TFT drive. More specifically, the liquid crystal layer must change from a light-scattering state to a transparent state when a voltage of this size is applied. The liquid crystal particle diameter at this time is approximately 1–2 µm, and the drive voltage rises as the particle diameter decreases. Scattering characteristics also improve. As a result, a good black display can be achieved by the liquid crystal layer in this area even without providing a black matrix over the signal lines between the pixels. Because the drive voltage of the liquid crystal layer is also high relative to the horizontal field occurring between the pixel electrodes and signal lines, light leakage does not occur.

It is to be noted that the best average particle diameter or average hole diameter for the polymer dispersion liquid crystals will vary according to the wavelength of the light to be modulated by the liquid crystal panel, but good contrast can be achieved if these values are in the range 1.5–2.0 µm for red light, 1.3–1.7 µm for green light, and 1.0–1.5 µm for blue light.

Figure 5:
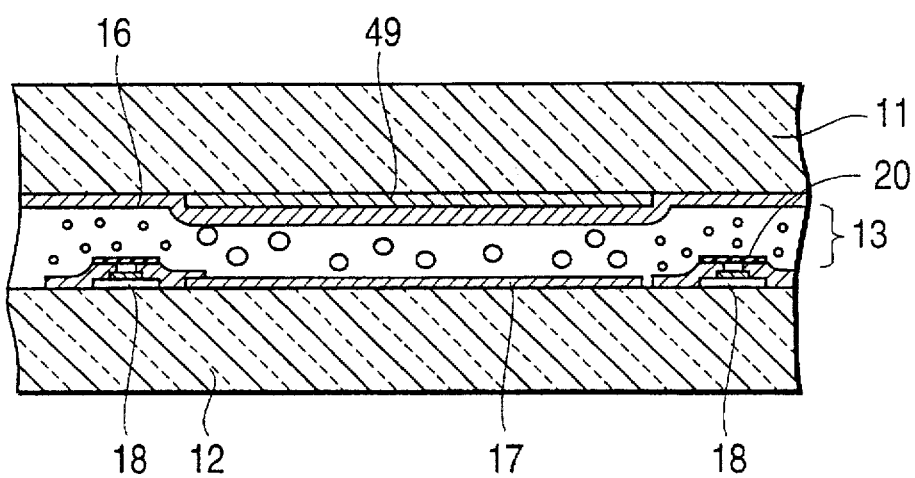
FIG. 5 is a cross section of a liquid crystal panel according to a second embodiment of the present invention.

The structure of a second embodiment of a liquid crystal panel according to the invention is described below with reference to FIG. 5 showing a cross section of the liquid crystal panel.

As shown in FIG. 5, an ultraviolet absorbing layer 49 of conductive thin film is patterned to form an ultraviolet absorbing means on the counter substrate 11. Other aspects of this second embodiment are the same as described in the first embodiment above (see FIG. 1), and the shape of the ultraviolet absorbing layer 49 is essentially the same as the pixel electrodes 17, as was the ultraviolet reflecting layer 19 in the first embodiment shown in FIG. 1. More specifically, however, the ultraviolet absorbing layer 49 is shaped similarly to the openings in the black matrix formed in a conventional liquid crystal panel. As a result, the ultraviolet absorbing layer 49 is formed slightly smaller than the area of the pixel electrodes 17.

Materials used for the conductive thin film forming this ultraviolet absorbing layer 49 are TiO$_2$ and SiO by way of example only. Note that the refractive index of TiO$_2$ is 2.3, and the refractive index of SiO is 1.7. Both materials absorb light in the ultraviolet wavelength band, and transmit visible light. The wavelength band of absorbed light and the absorption factor vary according to the vapor deposition conditions of the thin film, and must therefore be experimentally determined. For example, if TiO$_2$ is separately formed with a physical film thickness of 0.075 µm, the light absorption factor will be 40% with 350 nm wavelength light, 30% with 370 nm wavelength light, and 16% with 380 nm wavelength light; there is virtually no absorption of visible light. This structure is therefore effective using ultraviolet light of a 350–370 nm wavelength. The degree of vacuum during vapor deposition was approximately 1×10$^{-4}$ Torr.

The degree of vacuum during vapor deposition of the SiO$_2$ film was in the range 1×10$^{-5}$ Torr to 1×10$^{-6}$ Torr. If less than 1×10$^{-6}$ Torr, light absorption extends to the visible light spectrum, and if greater than 1×10$^{-5}$ Torr, ultraviolet light is also transmitted.

Liquid crystal panels comprising an uncured photosetting resin and a mixed liquid crystal solution filled between two substrates, on one of which this ultraviolet absorbing layer 49 is formed, are thus prepared. As in the first embodiment above, the liquid crystal panel is then exposed from the side of the counter substrate 11 with ultraviolet light, curing the mixed solution, forming the polymer matrix and phase separating the liquid crystals, and thus forming the polymer dispersion liquid crystal layer 13. The amount of ultraviolet light irradiated to the liquid crystal layer is different in the areas where the ultraviolet absorbing layer 49 is formed and the areas where the ultraviolet absorbing layer 49 is not formed. As a result, the average particle diameter of the liquid crystal drops in the areas where the ultraviolet absorbing layer 49 is not formed is extremely small relative to the average particle diameter of the liquid crystal drops in the areas where the ultraviolet absorbing layer 49 is formed.

By thus manufacturing the liquid crystal panels as described above, the liquid crystal particle diameter of the polymer dispersion liquid crystal layer 13 in the non-display area between the pixels as shown in FIG. 5 can be made extremely small relative to said diameter in the display area. The drive voltage of the liquid crystal layer must be 5–6V for TFT drive. More specifically, the liquid crystal layer must change from a light-scattering state to a transparent state when a voltage of this order is applied. The liquid crystal particle diameter at this time is approximately 1–2 µm, and the drive voltage rises as the particle diameter decreases. Scattering characteristics also improve. As a result, a good black display can be achieved by the liquid crystal layer in this area even without providing a black matrix over the signal lines between the pixels. Because the drive voltage of the liquid crystal layer is also high relative to the horizontal field occurring between the pixel electrodes and signal lines, light leakage does not occur.

It is to be noted that the invention has been described as an active matrix liquid crystal panel comprising thin-film transistors arrayed for the pixel electrodes 17, but the technical concept of forming an ultraviolet light reflecting layer and ultraviolet light absorbing layer can also be applied to a simple matrix-type liquid crystal panel. Therefore, the scope and technical concept of the present invention also include simple matrix type liquid crystal panels, and this applies to all further embodiments described below.

Further, transparent substrates such as thin films, plastic plates or the like are usable in stead of glass substrates.

It is also possible to reduce the ultraviolet transmittance of the ultraviolet reflecting layer 19 to 20% or less and to expose the liquid crystal panel to ultraviolet light from both the array substrate and counter substrate sides of the panel. In this case, it will be the ultraviolet light irradiated from the array substrate side of the liquid crystal panel that will set the resin on the pixel electrodes 17. Because the ultraviolet reflecting layer 19 is not formed on the array substrate 12, areas A of the pixel electrodes 17 (see FIG. 3) in particular are irradiated with ultraviolet light. The strength of the ultraviolet irradiation is adjusted so that the liquid crystals in areas A become light-transmitting at a 6–10-V drive voltage. A strong ultraviolet light is irradiated from the opposing substrate side. As a result, there is virtually no exposure to ultraviolet irradiation in areas A of the pixel electrodes 17 where the ultraviolet reflecting layer 19 is formed, but those areas where the ultraviolet reflecting layer 19 is not formed are strongly irradiated. The average particle diameter or average hole diameter of the liquid crystal drops in areas B is therefore extremely small relative to the diameter in areas A, thus inhibiting light transmission at the normal drive voltage and maintaining a constant light-scattering state. The ultraviolet light may be irradiated simultaneously from both the array substrate and the opposing substrate sides of the panel, or first from the array substrate side and then from the opposing substrate side of the panel.

Figure 6:
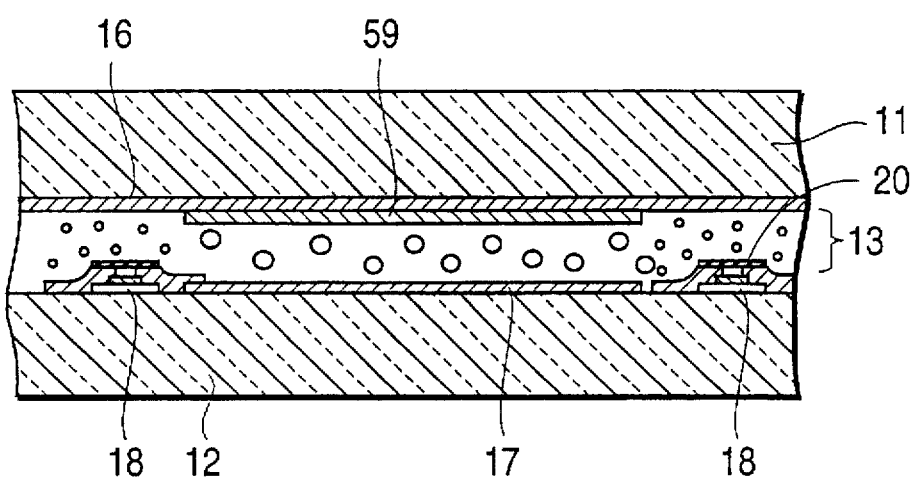
FIG. 6 is a cross section of a liquid crystal panel according to a third embodiment of the present invention.

It is also possible as shown in FIG. 6 to form an ultraviolet reflecting or absorbing conductive thin film 59 (referred as simply "conductive thin film" whether reflecting or absorbing below) on the counter electrode 16. A voltage drop will occur in this case if the film thickness of the conductive thin film 59 is too thick, and care is therefore required because voltage transmission to the liquid crystal layer 13 will be inhibited. If the film thickness of the conductive thin film 59 is proper, the holdability of voltage is enhanced since it is dielectric.

Figure 7:
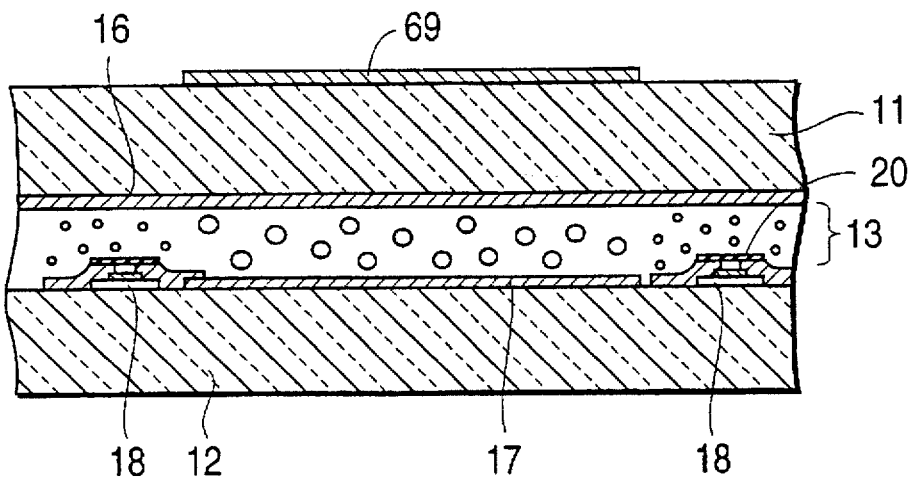
FIG. 7 is a cross section of a liquid crystal panel according to a fourth embodiment of the present invention.

As shown in FIG. 7, it is also possible to form a conductive thin film 69 on an upper side of the counter substrate 11 on a lower side of which the counter electrode 16 is formed. In this case, however, the counter substrate 11 is a thick 1 mm, and if the parallelism of the irradiated ultraviolet light is not good, it is difficult to form a liquid crystal layer of a different liquid crystal particle diameter in the desired areas.

Figure 8:
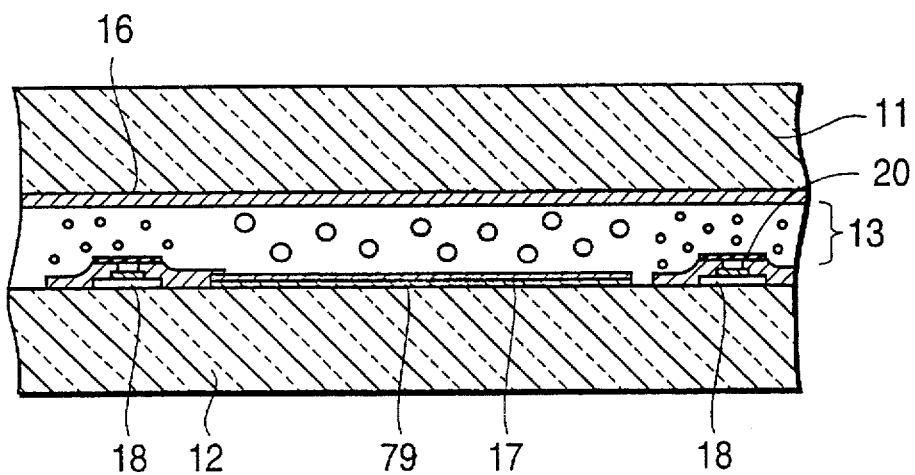
FIG. 8 is a cross section of a liquid crystal panel according to a fifth embodiment of the preset invention.

It is also possible to form a conductive thin film 79 in the area of the pixel electrodes 17 on the array substrate 12 as shown in FIG. 8. In this case the ultraviolet light is irradiated from the array substrate side of the liquid crystal panel to form the polymer dispersion liquid crystal layer; note that this differs from the manufacturing method described above. As a result, there is virtually no setting of the liquid crystal layer in this area because the signal lines and the TFT 18 pass virtually no light. The ultraviolet transmittance of the area of the pixel electrodes 17 is reduced by the conductive thin film 79, and if the liquid crystal in this area are irradiated with ultraviolet light to transmit at a 6–10-V drive voltage, the liquid crystals in the area between the pixel electrodes 17 and the signal lines will be strongly irradiated with ultraviolet light, and the liquid crystal layer in this area will be formed with liquid crystal drops of an extremely small particle diameter. The panel is then irradiated with ultraviolet light from the opposing substrate side to set the liquid crystal layer in the area of the signal lines and the TFT 18. The ultraviolet light is irradiated at high intensity in this case, forming liquid crystal drops with an extremely small particle diameter. As a result, the same effects obtained with the structure and method described with FIG. 1 are obtained.

Figure 9:
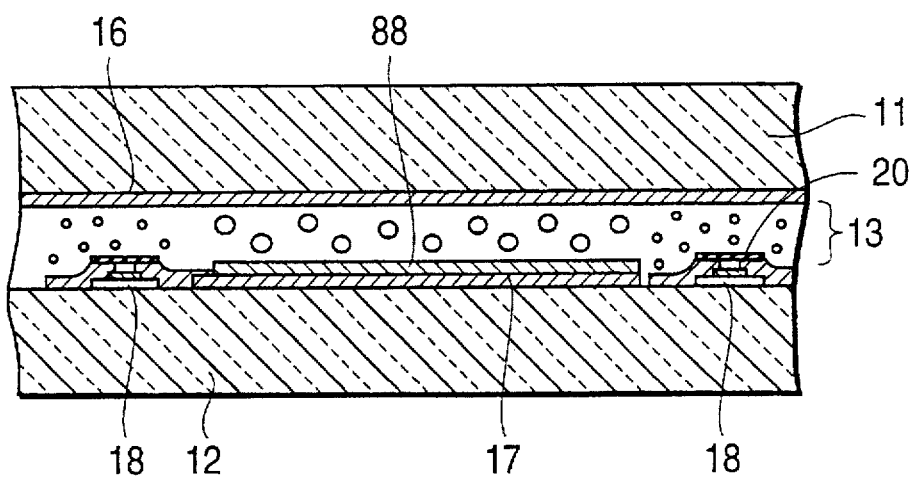
FIG. 9 is a cross section of a liquid crystal panel according to a sixth embodiment of the present invention.
Figure 10:
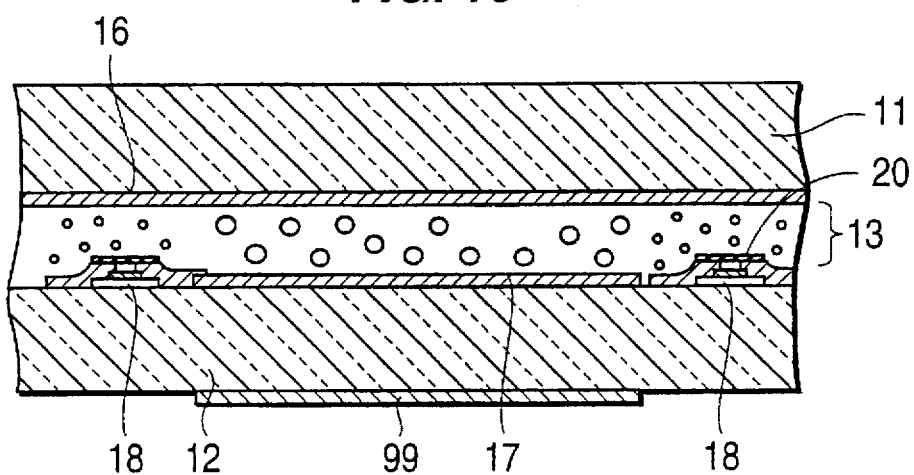
FIG. 10 is a cross section of a liquid crystal panel according to a seventh embodiment of the present invention.

As shown in FIGS. 9 and 10, it is also possible to form a conductive thin film 89 or 99 over the pixel electrodes 17 or on the side of the array substrate opposite that on which the pixel electrodes are formed, respectively.

The ultraviolet reflecting layer or the ultraviolet absorbing layer may be alternatively replaced with another means that does not transmit ultraviolet light. Examples include resin layers containing an ultraviolet absorber such as hydroxybenzophenone, benzotriazole, or a salicylic acid ester.

Figure 11:
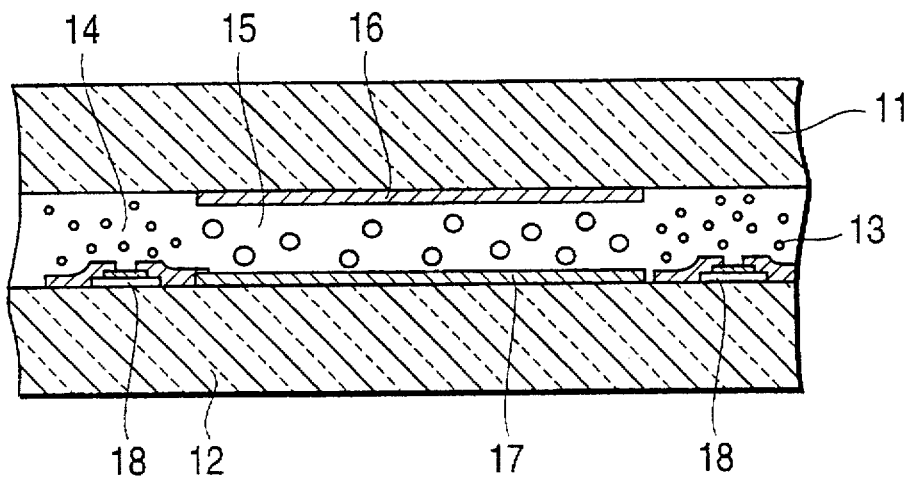
FIG. 11 is a cross section of a liquid crystal panel according to an eighth embodiment of the present invention.

The eighth embodiment of a liquid crystal panel according to the present invention is described below with reference to FIG. 11 and FIGS. 12 to 15. FIG. 11 is a cross section of a liquid crystal panel according to the present invention, and FIGS. 12 to 15 are plan views of an example of the electrode pattern on the counter substrate of the liquid crystal panel.

As shown in FIG. 11, a liquid crystal panel according to this embodiment comprises a polymer dispersion liquid crystal layer 13 sandwiched between two transparent substrates 11 and 12. Transparent electrodes forming the counter electrode 16 and pixel electrodes 17 are formed on the liquid crystal layer side of the substrates 11 and 12, respectively. The pixel electrodes 17 are formed in a matrix pattern, and TFT 18 are provided as switching elements near each of the pixel electrodes 17. Each of the TFT 18 is connected to the source signal line (not shown in the figures) and to the gate signal line (not shown in the figures); the TFTs are connected to the corresponding signal supply circuit and scanning circuit to supply the appropriate signal voltage to each pixel.

Light incident on the liquid crystal layer enters the layer when an electric field of sufficient strength is applied to the polymer dispersion liquid crystal layer 13, but is scattered when no electric field is applied. As a result, it is possible to control the light scattering state of the liquid crystal layer for each pixel by controlling the applied voltage.

Figure 15:
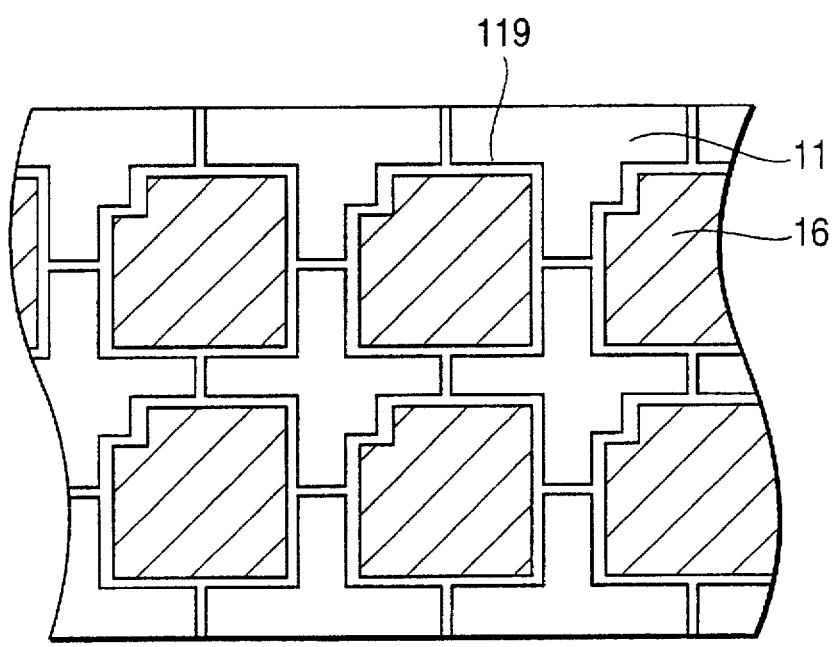
FIGS. 12, 13, 14 and 15 are plan views for showing a pattern of counter electrode according to the eighth embodiment of the present invention, respectively.
Figure 12:
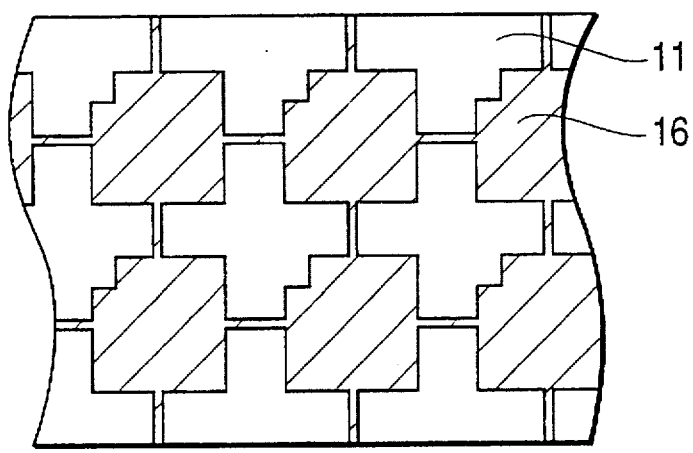
Figure 13:
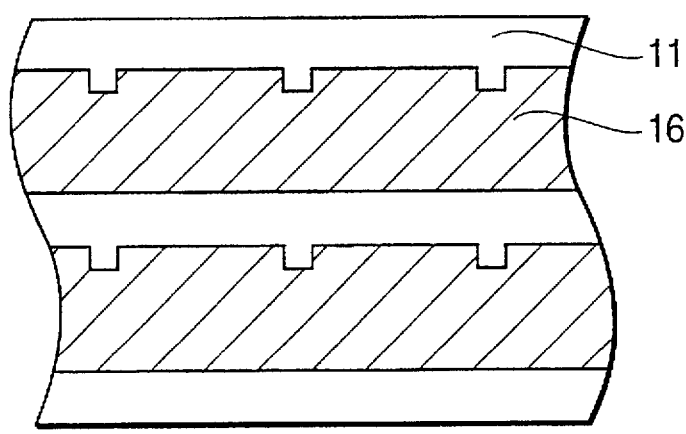
Figure 14:
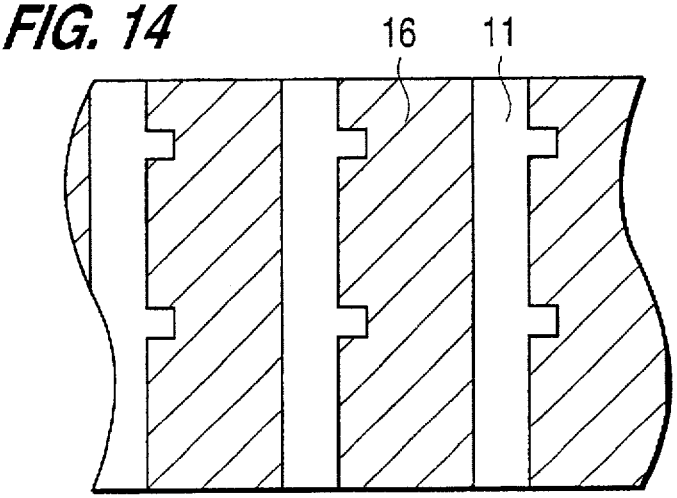

An ITO film, which is alloy of indium oxide and tin oxide, is used for the counter electrode, and is patterned for the display areas and the non-display areas. For example, the opposing electrodes 16 may be formed only in the area corresponding to the pixel electrodes 17 as shown in FIG. 12. The opposing electrodes in normal TN liquid crystals are often formed by an ITO film formed over the entire display area. However, the resistance of fine-line areas in the ITO connecting the counter electrodes 16 corresponding to the pixel electrodes 17 becomes high and is impractical with the structure shown in FIG. 12. The resistance is therefore reduced by providing a metal frame 119 around the fine-line parts of the ITO (shown in FIG. 12) and around the opposing electrodes 16 as shown in FIG. 15. In addition, the opposing electrodes 16 may be formed in a rectangular shape as shown in FIG. 13, and electrodes not formed in the areas corresponding to the gate signal lines and the TFT 18 of the non-display areas. Alternatively as shown in FIG. 14, the electrodes are not formed in the areas corresponding to the source signal lines and the TFT 18 of the non-display area. Configurations other than those shown here are also possible insofar as the counter electrodes are not formed in part of the non-display area.

Figure 16:
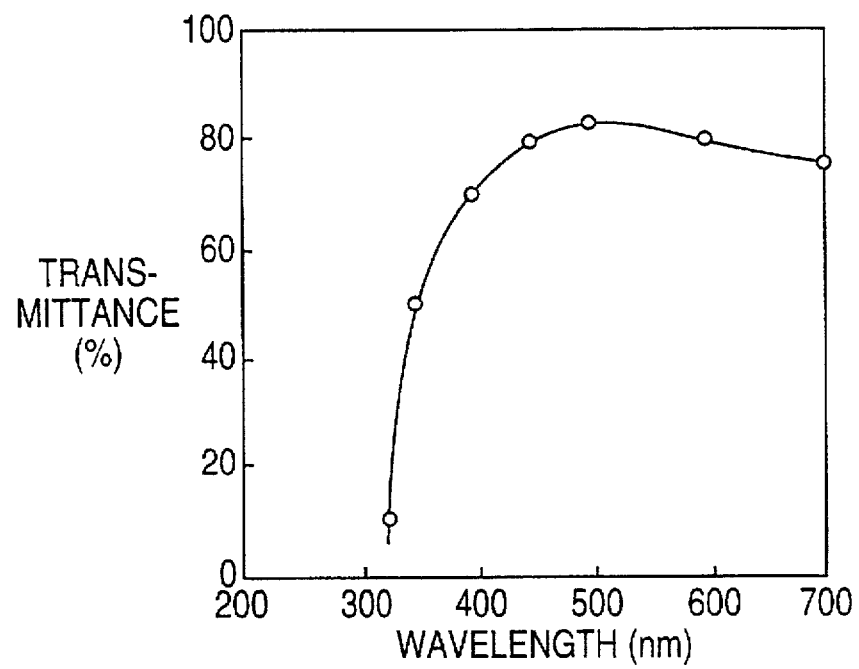
FIG. 16 is a graph of a light transmission characteristic of the counter electrode according to the eighth embodiment of the present invention.

FIG. 16 is a graph of the light transmittance at various wavelengths of the ITO film. As will be known from this graph, transmittance of light with a wavelength of 400 nm or less is extremely poor. This is also true with metallic oxide films other than ITO, e.g., CTO and ZnO, and such metallic oxide films can be alternatively used for the counter electrodes 16.

The liquid crystal panel is then exposed with ultraviolet light of a maximum 400-nm wavelength from the side of the counter substrate 11 formed as shown in FIGS. 12 to 15, curing the polymer matrix and phase separating the liquid crystals, and thus forming the polymer dispersion liquid crystal layer 13. The amount of ultraviolet light irradiated to the liquid crystal layer is different in the areas where the counter electrodes 16 are formed and the areas where the counter electrodes 16 are not formed. As a result, the liquid crystal particle diameter of the polymer dispersion liquid crystal layer 13 in the non-display area can be made extremely small relative to the particle diameter in the display area.

Figure 17:
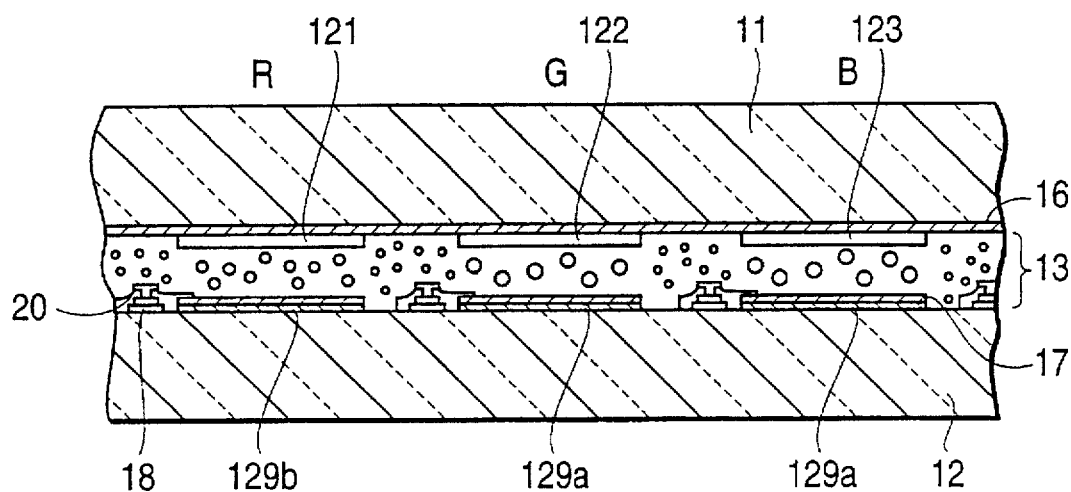
FIG. 17 is a cross section of a liquid crystal panel according to a ninth embodiment of the present invention.

The ninth embodiment of a liquid crystal panel according to the present invention is described below with reference to FIG. 17, a cross section of a liquid crystal panel according to the present invention. Red, green, and blue color filters are formed for each pixel of the liquid crystal panel according to this embodiment, enabling a color display with a single panel. A shield layer called a "black matrix" is formed between each color filter in a conventional liquid crystal panel, but no shield layer is required between the color filters in a liquid crystal panel according to the present invention. Other aspects of the structure of this liquid crystal panel are identical to those of the first embodiment above, and further description is therefore omitted. Color filters 121, 122, and 123 passing only red, green, and blue light, respectively, are formed on the counter substrate 11 at positions corresponding to the pixel electrodes 17, and ultraviolet reflecting layers 129a, 129a, and 129c are formed on the array substrate 12. The refractive index of the ultraviolet reflecting layer 129a formed for the green and blue pixels differs from the refractive index of the ultraviolet reflecting layer 129b for the red pixels; the refractive index of the red pixel ultraviolet reflecting layer 129b is higher than that of the green and blue pixel ultraviolet reflecting layers 129a. Note that while the ultraviolet reflecting layers 129 are shown between the array substrate 12 and the pixel electrodes 17 in FIG. 17, they may alternatively be on the outside surface of the array substrate 12 or on the pixel electrodes 17 in contact with the liquid crystal layer 13. It is also possible to eliminate (not form) the green and blue pixel ultraviolet reflecting layers 129a.

In the manufacturing processes for the liquid crystal panel of the invention, ultraviolet light is irradiated to the liquid crystal layer 13 for phase separation of the liquid crystal layer from the array substrate (on which the ultraviolet reflecting layer 129a is formed) side of the liquid crystal panel. This is because the color filters formed on the opposing substrate 11 will block transmission of ultraviolet light. The amount of ultraviolet light reaching the liquid crystal layer will again differ between the areas where the ultraviolet reflecting layer 129 is formed and where it is not formed. In addition, because the signal lines and TFT block ultraviolet light, the liquid crystal layer will remain uncured in those areas. The next step is therefore to irradiate the panel with strong ultraviolet light from the counter substrate side.

In the polymer dispersion liquid crystal layer 13 thus formed, the liquid crystal particle diameter in the liquid crystal layer of the pixel electrodes displaying red will differ from the particle diameter in the liquid crystal layer of the pixel electrodes displaying blue and green; the scattering characteristics and drive voltage will both be higher in the liquid crystal layer displaying red. The polymer dispersion liquid crystal layer 13 also has a specific wavelength dependency, and the scattering characteristics are poor and the drive voltage is low with red light in particular. If the ultraviolet transmittance of the ultraviolet reflecting layer 129 is adjusted according to the present invention, it is possible to form a liquid crystal layer exhibiting uniform red, green, and blue characteristics. The liquid crystal layer in the areas other than the pixel electrodes has an extremely small average particle diameter in the liquid crystal drops, resulting in good scattering performance and a high drive voltage. As a result, a good black display is obtained and contrast is improved.

The tenth embodiment of a liquid crystal panel according to the present invention is described below with reference to FIG. 18.

Figure 18:
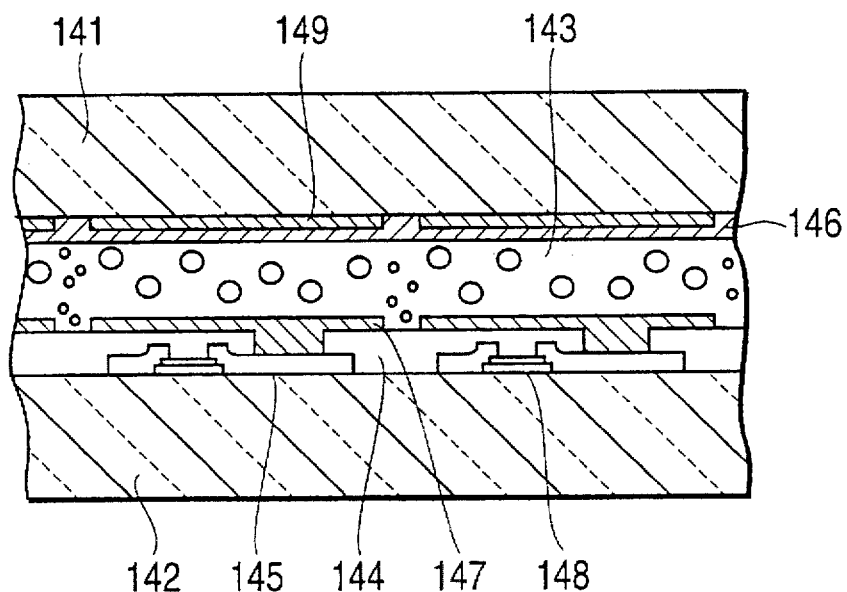
FIG. 18 is a cross section of a liquid crystal panel according to a tenth embodiment of the present invention.

As shown in FIG. 18, a matrix-shaped TFT 148 is formed on the array substrate 142, and the aluminum pixel electrodes 147 are formed over the TFT 148 with an insulating layer 144 therebetween. Each of the pixel electrodes 147 is connected to the array electrodes 145 of each TFT 148. On the opposing substrate 141, the opposing electrodes 146 are formed from ITO or another transparent electrode film.

The conductive thin film 149 is patterned on the surface of the counter substrate. The pattern of the conductive thin film 149 essentially matches the pixel electrodes 147, as does the ultraviolet reflecting layer shown in FIG. 1. More specifically, however, the conductive thin film 149 is shaped similarly to the openings in the black matrix formed in a conventional liquid crystal panel. As a result, the conductive thin film 149 is formed slightly smaller than the area of the pixel electrodes 147. If the liquid crystal panel is then exposed from the side of the counter substrate 141 with ultraviolet light to form the polymer dispersion liquid crystal layer, the liquid crystal particle diameter of the liquid crystal layer below the area in which the ultraviolet reflecting layer is not formed will be extremely small relative to the particle diameter in the liquid crystal layer under the ultraviolet reflecting layer. As the particle diameter decreases, the drive voltage increases and the scattering characteristics improve. As a result, a good black display can be achieved by the liquid crystal layer in this area even without providing a black matrix over the signal lines between the pixels. Because the drive voltage of the liquid crystal layer is also high relative to the horizontal field occurring between the pixel electrodes and signal lines, light leakage does not occur.

The conductive thin film may also be formed in a position such as shown in FIGS. 6 and 7. Any conductive thin film may also be used insofar as it reflects or absorbs ultraviolet light, and materials other than a conductive thin film may be used insofar as the essential characteristics are the same. The opposing electrodes may also be patterned as described in the eighth embodiment. In addition to the present embodiment, it is also possible for the pixel electrodes shown in FIG. 1 to be reflecting electrodes of aluminum in a reflecting-type liquid crystal panel, but the present embodiment offers a larger aperture ratio and greater resistance to TFT photoconductivity.

Figure 19:
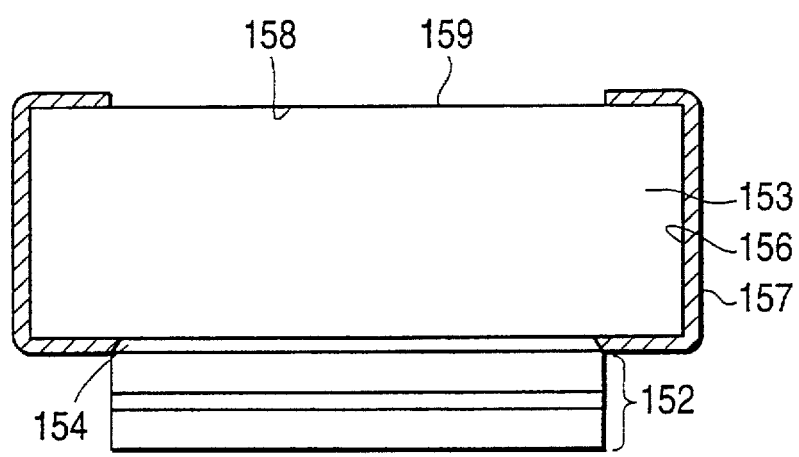
FIG. 19 is a cross section of a liquid crystal panel according to an eleventh embodiment of the present invention.

FIG. 19 is a cross section of a liquid crystal display apparatus according to an eleventh embodiment of the invention. The liquid crystal display (LCD) apparatus 151 shown in FIG. 19 comprises a liquid crystal panel 152 according to the first or second embodiment of the invention; a transparent plate 153; and a transparent body 154. The transparent plate 153 is connected to the emission side of the liquid crystal panel 152 with the transparent body 154 therebetween. A spacer is provided around the circumference between a glass plate 11 and the transparent plate 153; this spacer limits the thickness of the transparent body 154. A black coating 157 is applied to the side 156 of the transparent plate 153, and an anti-reflective film 159 is provided over at least the effective display area of the emission surface 158 of the transparent plate 153.

Figure 20:
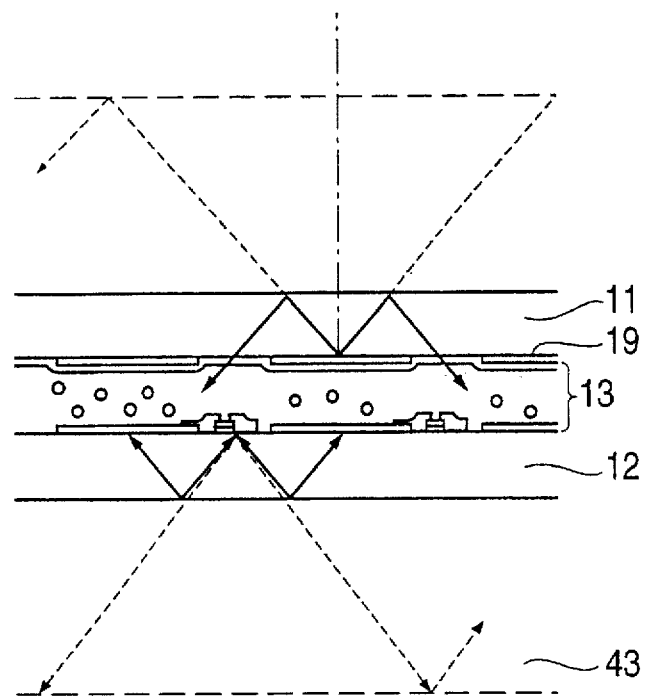
FIG. 20 is an explanatory view for showing effects obtained according to the eleventh embodiment of the present invention.

Referring to FIG. 20, the glass substrate 12 is a 1 mm thick glass plate; transparent plate 153 is a 10 mm thick glass plate; and the refractive index of both is 1.52. The transparent body 154 is a transparent silicon resin body KE1051, 0.5 mm thick with a 1.40 refractive index, manufactured by Shin'etsu Kagaku Kogyo K. K. This is formed using two different solutions that are mixed and then left at room temperature or heated, inducing an addition polymerization reaction setting the solutions as a gel.

The transparent plate 153 may be an acrylic or other transparent resin. The transparent body 154 may be any transparent material; common materials include ethylene glycol or other fluid, an epoxy type transparent adhesive, and transparent silicon resins that set to a gel state when exposed to ultraviolet light. In all cases, the presence of an air layer between the glass substrate 12 and the transparent plate 153 will cause picture quality problems, and it is therefore necessary to eliminate any air layer.

If the liquid crystal panel is manufactured as described in the first and second embodiments above, the ultraviolet light passing the liquid crystal layer 13 will reflect at the substrate-air interface and re-enter the liquid crystal layer 13 as shown in FIG. 20 when exposed to ultraviolet light. This reflected light further advances the phase separation of the liquid crystal layer. As a result, the liquid crystal layer in the area in which the ultraviolet reflecting layer 19 is formed will also be set by the reflected ultraviolet light, and the difference in characteristics resulting from the presence or absence of the ultraviolet reflecting layer 19 will decrease. If, however, transparent plates 153 as shown in FIG. 15 are provided at substrates 11 and 12, the thickness from the polymer dispersion liquid crystal layer 13 to the emission surface 158 contacting the air will increase, scattered light emitted from the liquid crystal layer 13 will be reflected at the emission surface 158 of the transparent plate 153, and the brightness of the light reflected back to the liquid crystal layer 13 will decrease.

If this configuration is used in the liquid crystal panel, the brightness of light re-scattered by the liquid crystal layer 13 will be less than that when the transparent plate 153 is not provided. As a result, black floating in the non-display area between pixels can be prevented. Light incident to the sides 156 of the transparent plate 153 is absorbed by the black coating 157 applied to the sides 156, reducing the amount of light reflected to the liquid crystal layer 13 and improving the contrast of the displayed image on the liquid crystal layer 13. Because a non-reflective film 159 is provided on the emission surface 158 of the transparent plate 153, reflections at the emission surface 158 of light emitted from the liquid crystal layer 13 with a small emission angle are reduced; this also contributes to improved contrast.

It is also possible to prevent error operation of each TFT due to the photoconductivity thereof because scattered light emitted from the liquid crystal layer 13 is reflected by the emission surface 158 of the transparent plate 153, and the light incident to the TFT 18 can be reduced.

It is to be noted that the transparent plate 153 is optically bonded to the substrate 11 using a transparent body 154 in order to obtain the desired thickness in the above embodiment, but the substrate itself may be manufactured to the necessary thickness. To decrease the thickness of the transparent plate, it is also possible to make the surface on the far side of the panel concave. It is even more preferable to also form the same on the emission side of the liquid crystal panel 152, i.e., on the array substrate 12.

The above configuration is described in further detail in Japanese patent application HEI 4-145277, which should be referenced. The liquid crystal panel of the present embodiment of the invention also covers transparent plates and substrates of a specific thickness, which are the technical concept underlying the above Japanese patent application.

Figure 21:
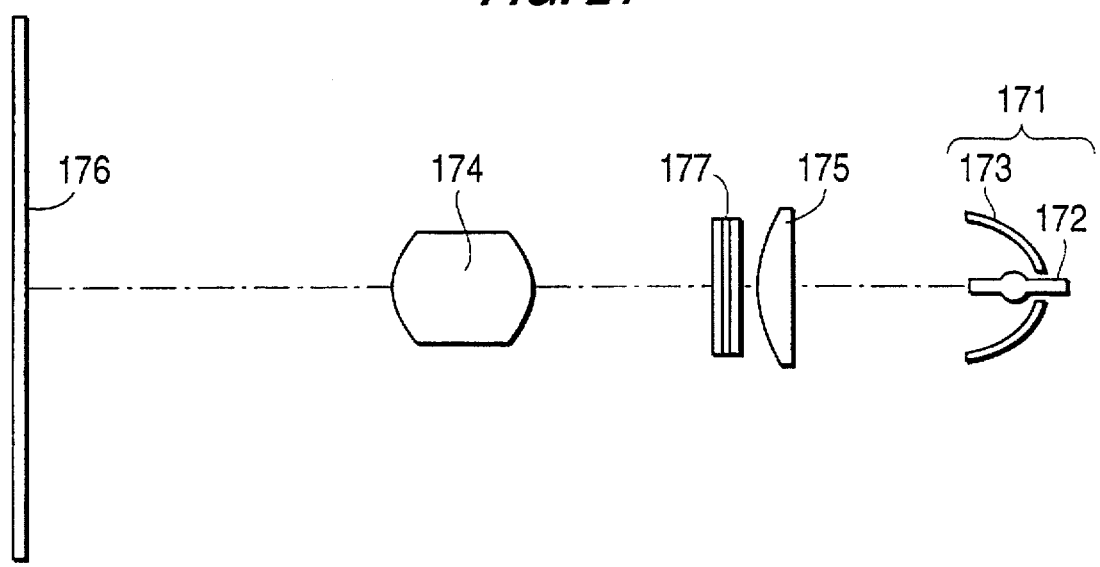
FIGS. 21, 22, 23, 24, 25 and 26 are compositional views of projection type LC displays using liquid crystal panels according to the present invention, respectively.

The first embodiment of a liquid crystal projection television according to the present invention is shown in FIG. 21.

The liquid crystal projection television comprises a liquid crystal panel 177 according to the first embodiment of the present invention; a light source 171; projection lens 174; and a screen 176.

The light source 171 comprises a lamp 172 and concave mirror 173; light emitted from the lamp 172 is focused by the concave mirror 173 to emit a light beam with relatively narrow directivity. The field lens 175 refracts the light passing the periphery of the display area of the liquid crystal panel 177 to the inside to be incident on the pupil of the projection lens 174. The effect of the field lens 175 is to prevent the periphery of the projected image from becoming dark.

The liquid crystal panel 177 is constructed as shown in FIG. 1; optical images are formed as changes in the light scattering according to the video signal. The projection lens 174 gathers light within a solid angle of the light emitted from each pixel. When the scattering of light emitted from each pixel changes, the amount of light contained within that solid angle also changes, and the optical image formed on the liquid crystal panel 177 as a change in light scattering is converted to a change in the brightness on the screen 176. Thus, the optical image formed on the liquid crystal panel 177 is enlarged and projected by the projection lens 174 to the screen 176.

The liquid crystal projection television of the invention can display good contrast images without providing a black matrix in the liquid crystal panel 177 because the liquid crystal layer over the signal lines and TFT can display well-defined blacks. It is to be noted that the liquid crystal panel 177 may also be a liquid crystal panel according to any of the embodiments 2 through 8 above. Furthermore, if the liquid crystal panel 177 is a liquid crystal panel comprising color filters according to the ninth embodiment above, a high contrast, good white display can be obtained in addition to a full-color RGB display. In all cases, display problems caused by visible light are prevented because both the ultraviolet reflecting layer and the ultraviolet absorbing layer will not pass visible light. Conversely, these layers block ultraviolet light from reaching the liquid crystals, therefore inhibit deterioration of the liquid crystals, and improve the reliability of the liquid crystal panel.

Figure 22:
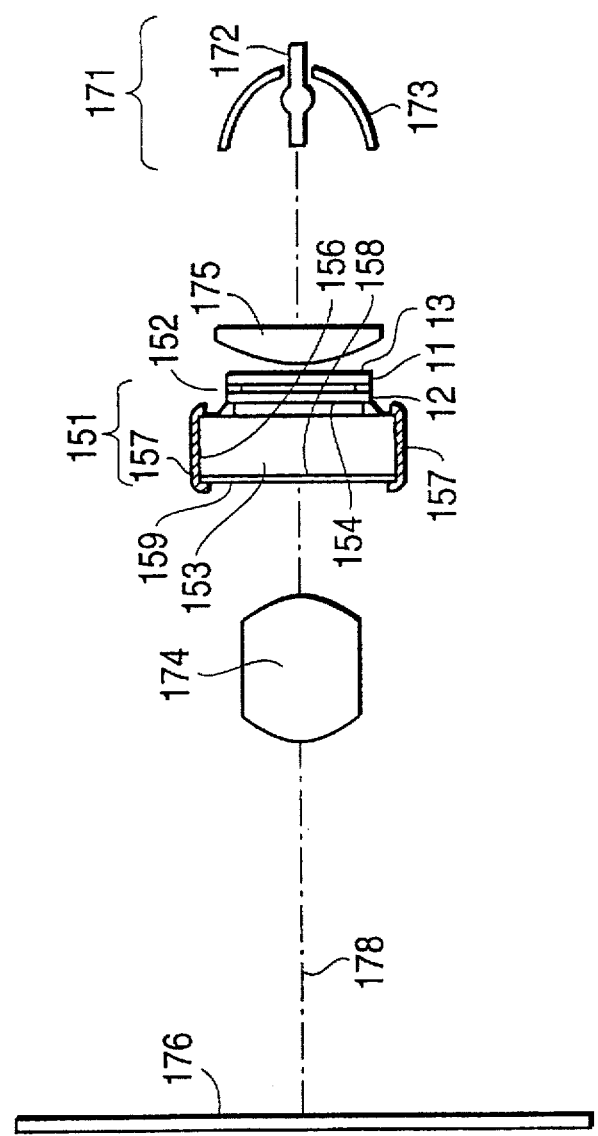

A second embodiment of a liquid crystal projection television according to the present invention is shown in FIG. 22. LCD apparatus 151 shown in FIG. 22 comprises a liquid crystal panel 152, a transparent plate 153, and a transparent body 154. The light source 171, projection lens 174, screen 176 are as described in the liquid crystal projection television above; this LCD apparatus 151 is an LCD apparatus according to the eleventh embodiment of the invention.

Light emitted from the light source 171 passes in sequence through the field lens 175, liquid crystal panel 152, transparent body 154, and transparent plate 153, and is incident therefrom on the projection lens 174. The size of the pupil of the projection lens 174 is large enough to gather approximately 90% of all light emitted through a transparent pixel in the middle of the liquid crystal panel 152. Good imaging characteristics are obtained by combining the projection lens 174 with the transparent plate 153. Focusing the projected image is done by moving the projection lens 174 along the optical axis 178.

A liquid crystal projection television according to the present invention can provide a good contrast display because secondary scattering by the liquid crystal layer of light scattered once by the liquid crystal panel 152 and then reflected at the substrate-air interface can be prevented. Black floating between the pixels caused by secondary scattering can also be prevented, yielding a sharp display.

Figure 23:
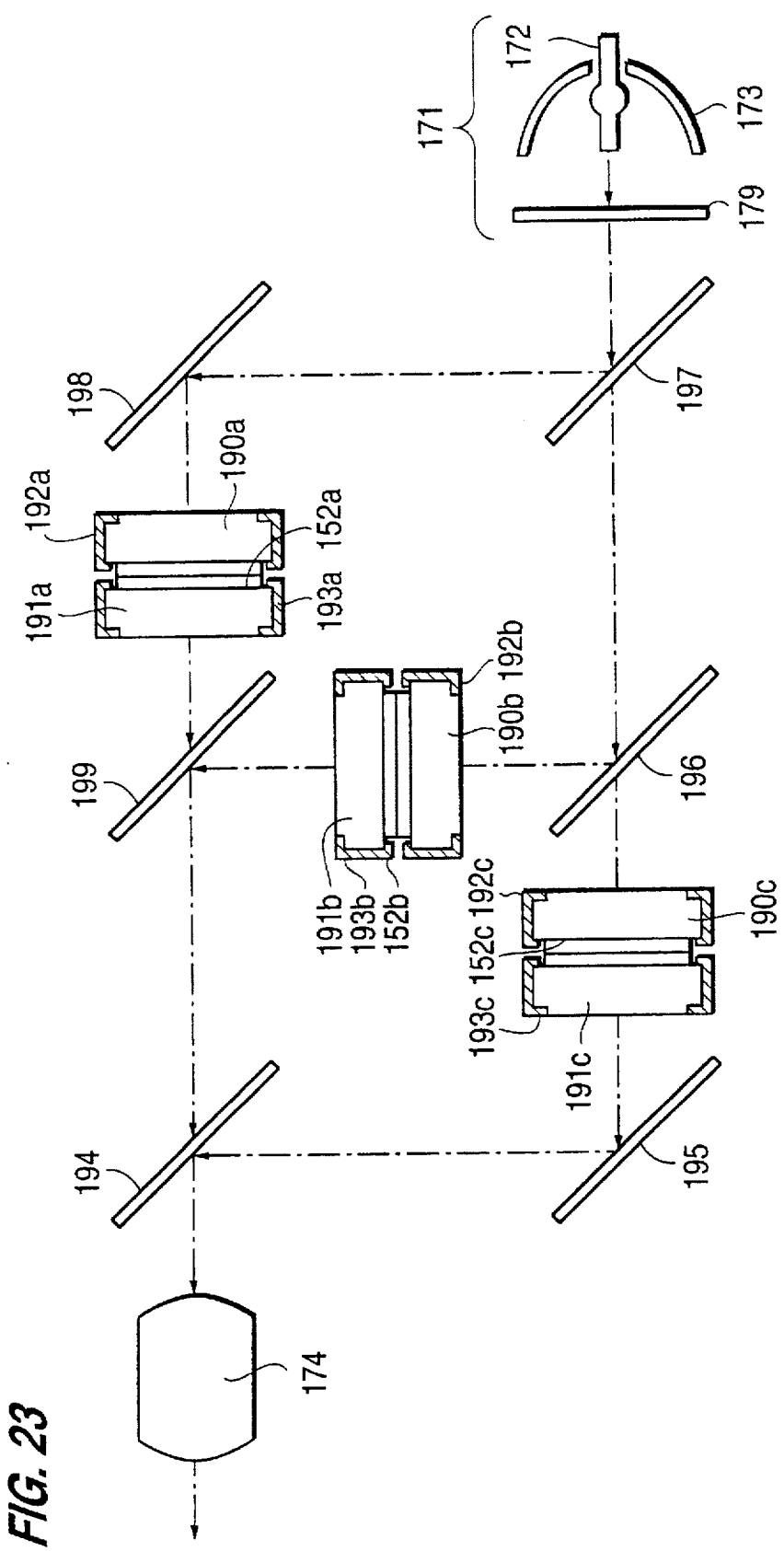

A third embodiment of a liquid crystal projection television according to the present invention is shown in FIG. 23. This liquid crystal projection television comprises three liquid crystal panels 152a, 152b, and 152c; a light source 171; projection lens 174; transparent plates 190a, 190b, and 190c; transparent plates 191a, 191b, and 191c; dichroic mirrors 194, 196, 197, and 199; and flat mirrors 195, and 198.

Liquid crystal panels 152a, 152b, and 152c are polymer dispersion liquid crystal panels as shown in FIG. 1 and described above. As shown in FIG. 19, the transparent plates 190a, 190b, and 190c are bonded with a transparent adhesive to the incidence side of the respective liquid crystal panels, and the transparent plates 191a, 191b, and 191c are bonded with a transparent adhesive to the emission side of the respective liquid crystal panels. The sides of the transparent plates 190a, 190b, and 190c, and 191a, 191b, and 191c are coated with black coating 192a, 192b, 192c, 193a, 193b, and 193c.

The light source 171 comprises a lamp 172, concave mirror 173, and filter 179. The lamp 172 is a metal halide lamp that emits light containing red, green, and blue primary color components. The concave mirror 173 is glass; the reflective surface is coated by vapor deposition with a multicoating film that reflects visible light and passes infrared light. The visible light in the light emitted from the lamp 172 is reflected by the reflective surface of the concave mirror 173, and this reflected light is nearly-parallel light. The reflected light emitted from the concave mirror 173 is filtered by the filter 179 to remove infrared and ultraviolet light.

The light from the light source 171 is incident to the color separation optics, which is the combination of the dichroic mirrors 196 and 197, and flat mirror 198, and is separated into the three primary colors. The primary color light is passed through corresponding field lenses (not shown in the figures) to the liquid crystal panels 152a, 152b, and 152c. The light from the liquid crystal panels 152a, 152b, and 152c is then recombined into a single beam by the color synthesis optics, which is the combination of dichroic mirrors 194 and 199, and flat mirror 195, and is incident therefrom on the projection lens 174. The optical images formed on the liquid crystal panels 152a, 152b, and 152c as a change in light scattering according to the corresponding video signals are thus enlarged and projected by the projection lens 174 to the screen 176.

Because the transparent plates 190a, 190b, and 190c, and 191a, 191b, and 191c suppressing extraneous light on the incidence and emission sides of the liquid crystal panels 152a, 152b, and 152c are coupled, loss of contrast due to this extraneous light can be suppressed. Note, however, that it is also possible to eliminate these transparent plates and use only the liquid crystal panels 152a, 152b, and 152c as shown in FIG. 21. In addition, because three liquid crystal panels 152a, 152b, and 152c are used for red, green, and blue, respectively, a projected image with good resolution and brightness can be obtained.

In addition, the scattering characteristics of the polymer dispersion liquid crystals are wavelength-dependent. The scattering characteristics of red light in particular are poor. As a result, by making the reflectivity of the ultraviolet reflecting layer in one of the liquid crystal panels 152a, 152b, and 152c different from the reflectivity of the ultraviolet reflecting layer in the other panels, the liquid crystal particle diameter of the display area will be different from that of the other panels when irradiated with ultraviolet light of the same intensity. More specifically, if the reflectivity of the ultraviolet reflecting layer in the liquid crystal panel corresponding to red is less than that of the other panels, the panel will have better scattering characteristics than the other liquid crystal panels, but the effective scattering characteristics will be equivalent in all three panels. As thus described, it is therefore preferable to provide effectively equivalent scattering characteristics in each of the panels.

Figure 24:
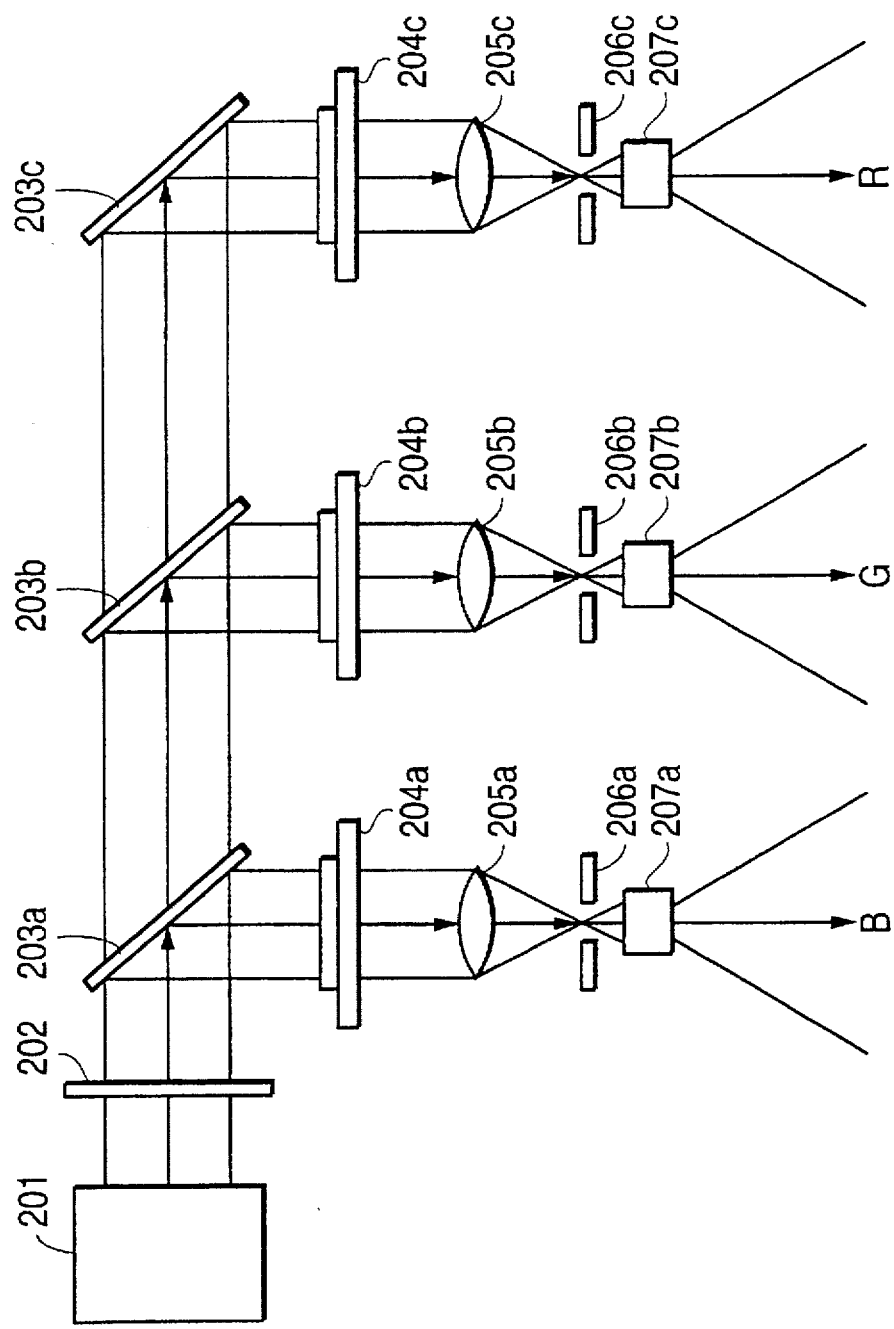

It is to be noted that the dichroic mirrors used in the color separation and synthesizing optics above can be simple color filters. It is also possible to eliminate the color synthesis optics and provide a separate projection lens for each of the red, green, and blue modulation systems as shown in FIG. 24. The liquid crystal projection television comprises a light source 201, a filter 202, dichroic mirrors 203a and 203b, flat mirror 203c, liquid crystal panels 204a, 204b and 204c, focusing lenses 205a, 205b and 205c, projection pupils 206a, 206b and 206c and projection lenses 207a, 207b and 207c. In this case, separate red, green, and blue images are projected by the respective projection lenses, and the images are merged on screen to create a composite color image.

Figure 25:
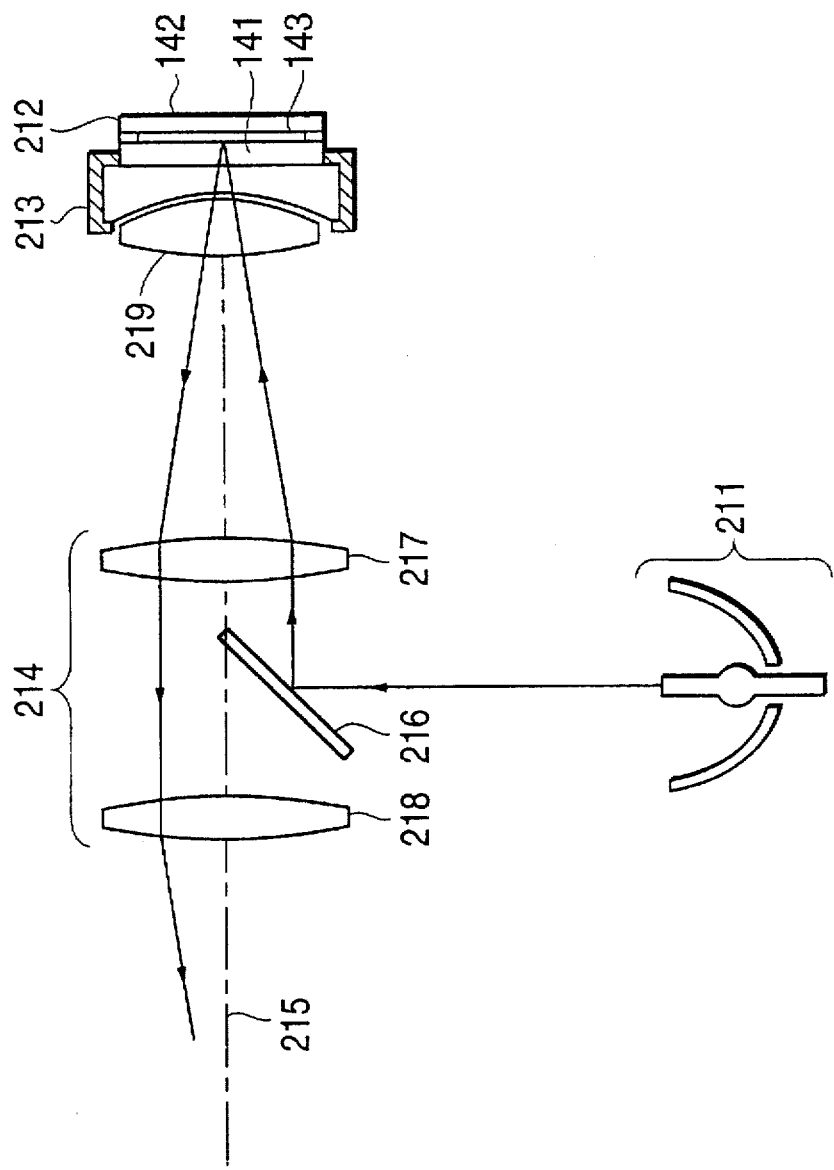

A fourth embodiment of a liquid crystal projection television according to the present invention is shown in FIG. 25. This liquid crystal projection television comprises a light source 211; flat mirror 216; projection lens 214; and liquid crystal panel of reflection type 212. Note that the light source 211 is the same as that shown in FIG. 21.

The liquid crystal panel 212 of this embodiment comprises a reflective-type liquid crystal panel as shown in FIG. 18 combined with a plano-concave lens 213 and a positive lens 219. These lenses are provided to obtain the same effect achieved with the transparent plate 153 shown in FIG. 19, and may be either replaced by the transparent plate 153 or simply eliminated. The sides and reactive face of the plano-concave lens 213 is coated with a black coating to absorb extraneous scattered light. The flat surface of the plano-concave lens 213 is optically coupled to the glass substrate 142 of the liquid crystal panel with a transparent adhesive.

The projection lens 214 comprises a first lens group 217 on the liquid crystal panel side, and a second lens group 218 on the screen side; the flat mirror 216 is provided between the first and second lens groups. The normal line of the reflective surface of the flat mirror 216 is at a 45° angle to the optical axis 215 of the projection lens 214. The light from the light source is reflected by the flat mirror 216, passes the first lens group 217, passes the positive lens 219 and the plano-concave lens 213, and is incident to the liquid crystal panel 212. After the scattered light emitted from the pixel at the image center of the liquid crystal panel 212 passes the first lens group 217, approximately half of the light is blocked by the flat mirror 216, and the remaining light is incident on the second lens group 218 and is projected to the screen. By combining a plano-concave lens and a positive lens, the projection lens 214 images the optical image on the liquid crystal layer on the screen. In addition, the light rays from the center of the projection lens aperture toward the liquid crystal panel are telecentric, i.e., they are approximately perpendicularly incident to the liquid crystal layer.

Because the liquid crystal particle diameter of the liquid crystal layer in the areas of the signal lines and TFT is smaller than in the display area, the liquid crystal panel of the invention does not require a black matrix or other shield layer on the opposing substrate side. As a result, light cannot be reflected by a black matrix, producing extraneous reflected light that lowers contrast, and an extremely high contrast display can obtained at all times.

Figure 26:
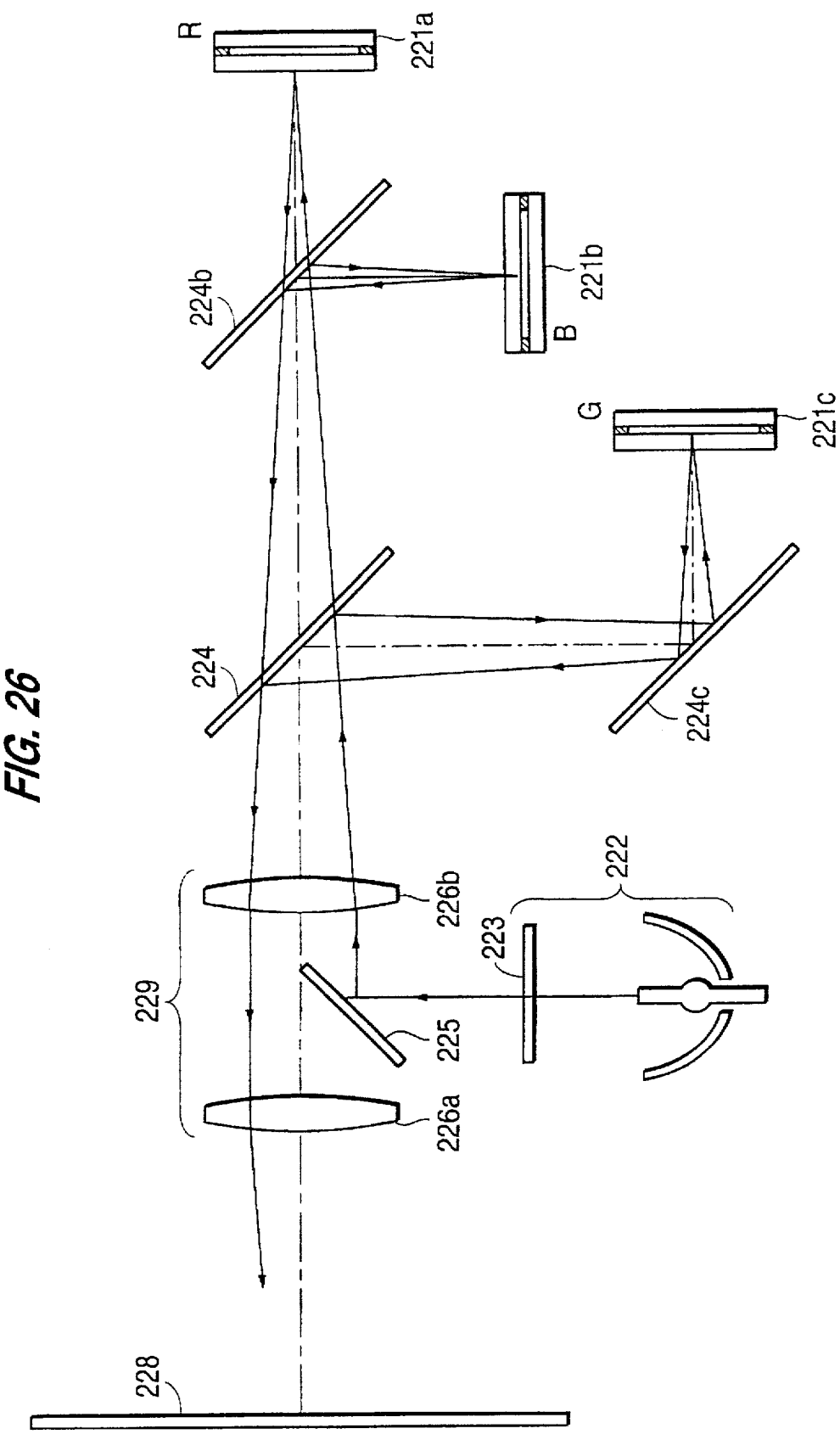
Figure 27:
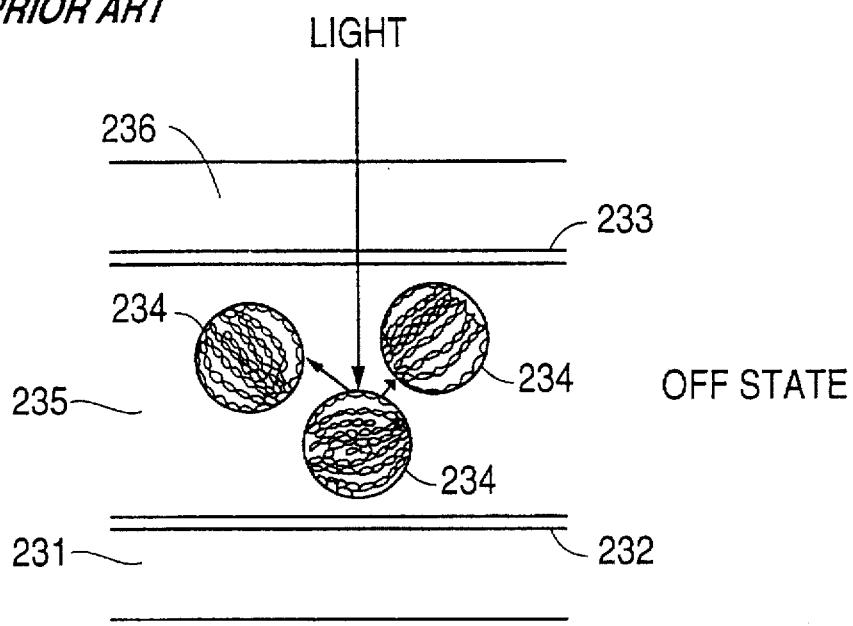
FIGS. 27 and 28 are explanatory views for showing the light valve action of PNLC where
Figure 28:
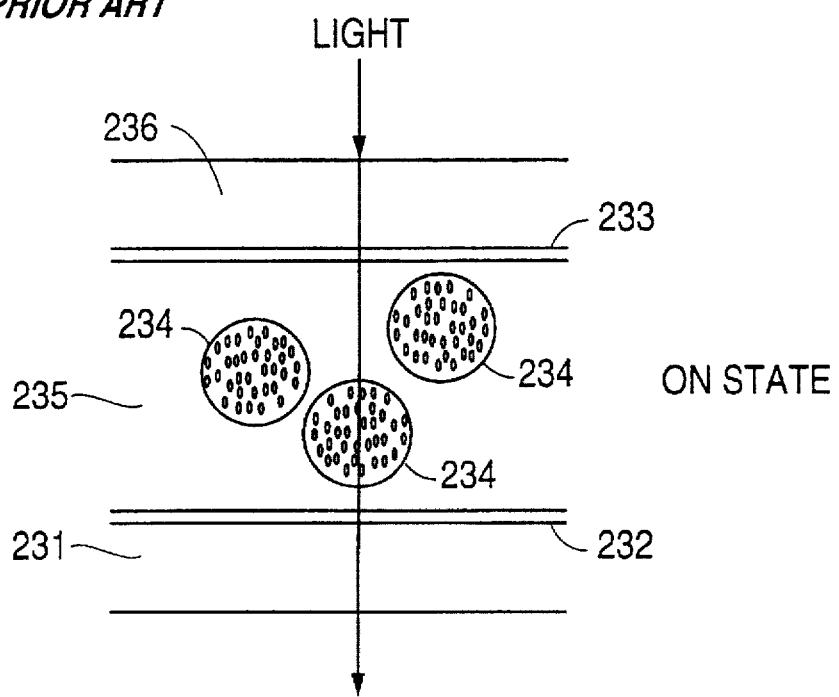

A fifth embodiment of a projection display device according to the present invention is shown in FIG. 26. This projection display device is a light-valve type projection display device, and comprises a light source 222; UVIR filter 223; green dichroic mirrors 224a and 224c; a blue dichroic mirror 224b; reflection-type polymer dispersion liquid crystal panels 221a, 221b, and 221c; lenses 226a and 226b; a mirror 225; and a screen 228.

Note that the placement of green dichroic mirrors 24a and 224c shall not be limited to that shown in FIG. 26, and that the green dichroic mirror 224c may be a total reflection mirror. In addition, lenses 226a and 226b form projection optics 229.

The operation of this embodiment is described below. The red, green, and blue modulating systems are described below with reference to the blue modulating system. First, white light is emitted from the light source 222, reflected by the mirror 225, and then color separated by the dichroic mirrors. The blue component of the white light is reflected by the blue dichroic mirror 224b, and is incident to the corresponding liquid crystal panel 221b. This liquid crystal panel 221b is a reflection-type liquid crystal panel as shown in FIG. 18. The scattering state of incident light is controlled by the signal applied to the pixel electrodes 147 to modulate the light. Light reflected by the scattered state of the liquid crystal panel 221b is blocked by the mirror 225 placed in the pupil of the projection optics 229, and light reflected in the transparent state passes through the pupil of the projection optics 229. The passed light is then enlarged and projected to the screen 228 by the projection optics 229.

This same basic operation applies to red and green light. It should be noted, however, that the green dichroic mirror 224a and blue dichroic mirror 224b provided for color separation of the white light recombine the light modulated by the liquid crystal panel into a single image for projection by the projection lens.

Note that the light valve of the above embodiment shall not be limited to polymer dispersion liquid crystal panels, and may be any device whereby optical images are displayed as changes in the scattering of light. One example of an alternative light valve is the PLZT.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal panel comprising:
   a first substrate on which pixel electrodes are provided in a matrix pattern;
   a second substrate on which a transparent counter electrode is provided;
   an ultraviolet reducing means formed on one of said first and second substrates; and
   a polymer dispersion liquid crystal layer sandwiched between said first and second substrates for forming optical images as changes in the state of light scattering by said liquid crystal layer;
   wherein said ultraviolet reducing means is formed in a pattern substantially corresponding to said matrix pattern of said pixel electrodes;
   wherein said ultraviolet reducing means is formed from alternating layers of a high refractive index dielectric thin film and a low refractive index dielectric thin film and has a transmittance of 30% to 70%.

2. The liquid crystal panel according to claim 1 wherein an average particle diameter of drops of said polymer dispersion liquid crystal located over said pixel electrodes is greater than an average particle diameter of drops of said polymer dispersion liquid crystal located in other areas.

3. The liquid crystal panel according to claim 1 further comprising:
   color filters for the three primary colors, red, green and blue, for each pixel on one of said first and second substrates; and wherein the ultraviolet reduction rate of said ultraviolet reducing means formed over pixels for modulating red light is lower than that of said ultraviolet reducing means formed over the other pixels.

4. The liquid crystal panel according to claim 1 further comprising:
   switching devices formed on said first substrate; and
   an ultraviolet shielding layer for shielding said switching devices from ultraviolet rays.

5. A liquid crystal panel comprising:
   a first substrate on which pixel electrodes are arranged in a matrix pattern;
   a second substrate on which a transparent counter electrode is formed;
   an ultraviolet reducing means formed on one of said first and second substrates in a pattern substantially corresponding to said matrix pattern of said pixel electrodes; and
   a polymer dispersion liquid crystal layer sandwiched between said/first and second substrates for forming optical images as changes in the state of light scattering by said liquid crystal layer;

wherein at least one of said first and second substrates has a light transmittance and satisfies the condition defined by the following equation $$t \geq (d/4)\sqrt{n^2 - 1} \qquad [4]$$

where t is the center thickness of said substrate, n is the refractive index of said substrate, and d is the maximum diameter of the effective display area of the liquid crystal panel.

6. A liquid crystal panel comprising:

a liquid crystal panel member having a first substrate on which pixel electrodes are arranged in a matrix pattern;

a second substrate on which a transparent counter electrode is formed;

an ultraviolet reducing means formed on one of said first and second substrates in a pattern substantially corresponding to said matrix pattern of said pixel electrodes;

a polymer dispersion liquid crystal layer sandwiched between said first and second substrates for forming optical images as changes in the state of light scattering by said liquid crystal layer; and a transparent plate arranged on at least one of light incident and emission sides of said liquid crystal panel member;

wherein said liquid crystal panel member and said transparent plate are optically coupled by a transparent bonding agent; and said transparent plate satisfies the following equation $$t \geq (d/4)\sqrt{n^2 - 1} \qquad [5]$$

where t is the center thickness from the air-contact surface of said transparent plate to the liquid crystal layer, n is the refractive index, and d is the maximum diameter of the effective display area of the liquid crystal panel.

7. A liquid crystal projection display apparatus comprising:

a light source;

a liquid crystal panel for light-modulating an incident light emitted by said light source in accordance with an image to be displayed, which comprises;

a first substrate on which pixel electrodes are provided in a matrix pattern;

a second substrate on which a transparent electrode is provided;

an ultraviolet reducing means formed on one of said first and second substrates in a pattern substantially corresponding to said matrix pattern of said pixel electrodes, said ultraviolet reducing means being formed from alternating layers of a high refractive index dielectric thin film and a low refractive index dielectric thin film, and said ultraviolet reducing mean having a transmittance of 30% to 70%;

a polymer dispersion liquid crystal sandwiched between said first and second substrates for forming optical images as changes in the state of light scattering by said liquid crystal layer; and a projection means for projecting light modulated by said liquid crystal panel.

8. The liquid crystal projection display apparatus according to claim 7 wherein:

the substrate on which said ultraviolet reducing means is formed is the light incidence surface of said liquid crystal panel.

9. A liquid crystal projection display apparatus comprising:

a light source;

a color separation means for separating the light emitted from said light source into red, green, and blue wavelength lights;

three liquid crystal panels each having an ultraviolet reducing means which are arranged corresponding to said red, green and blue wavelength lights, respectively; and a projection means for projecting lights modulated by said three liquid crystal panels;

wherein the ultraviolet reduction rate of said ultraviolet reducing means of at least one of said liquid crystal panels is different from the ultraviolet reduction rate of the ultraviolet reducing means of the other liquid crystal panels.

10. A liquid crystal projection display apparatus comprising:

a light source;

a liquid crystal panel for light-modulating an incident light emitted by said light source in accordance with an image to be displayed, which comprises;

a first substrate on which pixel electrodes are arranged in a matrix pattern;

a second substrate on which a transparent counter electrode is formed; an ultraviolet reducing means formed on one of said first and second substrates in a pattern substantially corresponding to said matrix pattern of said pixel electrodes; and a polymer dispersion liquid crystal layer sandwiched between said first and second substrates for forming optical images as changes in the state of light scattering by said liquid crystal layer; and a projection means for projecting light modulated by said liquid crystal panel;

wherein at least one of said first and second substrates has a light transmittance and satisfies the condition defined by the following equation $$t \geq (d/4)\sqrt{n^2 - 1} \qquad [4]$$

where t is the center thickness of said substrate, n is the refractive index of said substrate, and d is the maximum diameter of the effective display area of said liquid crystal panel.

11. A liquid crystal projection display apparatus comprising:

a light source;

a liquid crystal panel for light-modulating an incident light emitted by said light source in accordance with an image to be displayed, which comprises;

a liquid crystal panel member having a first substrate on which pixel electrodes are arranged in a matrix pattern;

a second substrate on which a transparent counter electrode is formed;

an ultraviolet reducing means formed on one of said first and second substrates in a pattern substantially corresponding to said matrix pattern of said pixel electrodes;

a polymer dispersion liquid crystal layer sandwiched between said first and second substrates for forming optical images as changes in the state of light scattering by said liquid crystal layer;

a projection means for projecting light modulated by said liquid crystal panel;

a transparent plate arranged on at least one of light incident and emission sides of said liquid crystal panel member;

wherein said liquid crystal panel member and said transparent plate are optically coupled by a transparent bonding agent; and said transparent plate satisfies the following equation $$t \geq (d/4)\sqrt{n^2 - 1} \qquad [5]$$

where t is the center thickness from the air-contact surface of said transparent plate to the liquid crystal layer, n is the refractive index, and d is the maximum diameter of the effective display area of the liquid crystal panel.

12. A manufacturing method for a liquid crystal panel comprising steps of:

preparing first and second glass substrates;

forming pixel electrodes in a matrix pattern on said first glass substrate;

forming an ultraviolet reducing layer on said second glass substrate by alternatingly depositing a high refractive index dielectric thin film and a low refractive index dielectric thin film in a pattern substantially corresponding to said matrix pattern of said pixel electrodes, and ultraviolet reducing layer having a transmittance of 30% to 70%;

injecting a mixed solution of ultraviolet curing resin and liquid crystal into a gap between said first and second glass substrate assembled to have said gap; and forming a polymer dispersion liquid crystal layer by irradiating ultraviolet light from said second glass substrate side to cure said ultraviolet curing resin thereby making an average particle diameter of drops of said polymer dispersion liquid crystal located over said pixel electrodes larger than those located in other areas.

13. A liquid crystal projection display apparatus comprising:

a light source;

a color separation means for separating the light emitted from said light source into red, green, and blue wavelength light;

liquid crystal panels each having an ultraviolet reducing means which are arranged corresponding to said red, green and blue wavelength lights respectively; and a projection means for projecting lights modulated by said liquid crystal panels;

wherein the ultraviolet reduction rate of said ultraviolet reducing means of at least one of said liquid crystal panels is different from the ultraviolet reduction rate of the ultraviolet reducing means of the other liquid crystal panels.

* * * * *